US009828176B2

(12) United States Patent
Kaufman et al.

(10) Patent No.: US 9,828,176 B2
(45) Date of Patent: Nov. 28, 2017

(54) VERTICALLY EXPANDABLE RECEPTACLE

(71) Applicants: Philip Kaufman, Boynton Beach, FL (US); David M. Kaufman, New York, NY (US)

(72) Inventors: Philip Kaufman, Boynton Beach, FL (US); David M. Kaufman, New York, NY (US)

( * ) Notice: Subject to any disclaimer, the term of this patent is extended or adjusted under 35 U.S.C. 154(b) by 37 days.

(21) Appl. No.: 13/855,632

(22) Filed: Apr. 2, 2013

(65) Prior Publication Data

US 2013/0277365 A1 Oct. 24, 2013

Related U.S. Application Data

(60) Provisional application No. 61/619,359, filed on Apr. 2, 2012, provisional application No. 61/656,272, filed on Jun. 6, 2012.

(51) Int. Cl.

| | |
|---|---|
| ***A47J 47/18*** | (2006.01) |
| ***B65F 1/14*** | (2006.01) |
| ***B65F 1/06*** | (2006.01) |
| ***B65F 1/16*** | (2006.01) |
| *B65D 21/08* | (2006.01) |

(52) U.S. Cl.

CPC .............. *B65F 1/1426* (2013.01); *B65F 1/06* (2013.01); *B65F 1/16* (2013.01); *B65F 1/1615* (2013.01); *B65F 1/1623* (2013.01); *B65D 21/086* (2013.01); *B65F 2001/1676* (2013.01); *B65F 2220/1066* (2013.01)

(58) Field of Classification Search

CPC . B65D 21/086; B65F 1/06; B65F 1/16; B65F 1/1615; B65F 1/1623; B65F 2001/1676; B65F 2220/1066

USPC ....... 220/788, 4.03, 8, 495.06, 9.2, 9.3, 666, 220/4.21, 290, 902, 903; 206/499; 248/99; 141/316, 390

See application file for complete search history.

(56) References Cited

U.S. PATENT DOCUMENTS

| | | | | | |
|---|---|---|---|---|---|
| 1,015,455 | A | * | 1/1912 | Neesham | 220/8 |
| 2,454,455 | A | * | 11/1948 | Irwin | A24F 15/02 206/265 |
| 2,877,505 | A | * | 3/1959 | Stephens | 19/159 R |
| 3,175,853 | A | * | 3/1965 | Gilbertson | 292/86 |
| 3,329,298 | A | | 7/1967 | Demas | |
| 3,338,388 | A | * | 8/1967 | Igoe et al. | 206/8 |
| 3,454,151 | A | * | 7/1969 | Plaskan | 206/259 |
| 3,770,114 | A | * | 11/1973 | Jackson | 206/8 |

(Continued)

*Primary Examiner* — Fenn C Mathew
*Assistant Examiner* — Elizabeth Volz
(74) *Attorney, Agent, or Firm* — Charney IP Law LLC

(57) ABSTRACT

A receptacle has an outer housing with an aperture and an internal frame sized and configured to fit within the outer housing. A telescoping assembly is configured to associate with the aperture such that the receptacle may be placed in a first position or a second position, the internal volume of the receptacle being greater in the second position than the first. A second receptacle is formed from an inner portion and an outer portion offset by a stepped portion. The stepped portion forms a collar rest edge at a first height and a collar rest platform at a second height greater than the first height. A collar has a base and is adapted to fit over the inner portion such that the base may rest on the collar rest edge in a first position or the collar rest platform in a second position increasing the internal volume.

16 Claims, 20 Drawing Sheets

(56) References Cited

U.S. PATENT DOCUMENTS

| | | | | |
|---|---|---|---|---|
| 3,818,956 | A * | 6/1974 | Chamberlain | B65B 67/12 141/316 |
| 4,784,112 | A * | 11/1988 | Hayashi | 126/262 |
| 4,960,149 | A | 10/1990 | Rizzitiello | |
| 5,295,606 | A | 3/1994 | Karwoski | |
| 5,372,269 | A | 12/1994 | Sutton et al. | |
| 5,388,714 | A * | 2/1995 | Zutler | 220/4.24 |
| 5,715,962 | A * | 2/1998 | McDonnell | 220/4.03 |
| 5,829,591 | A * | 11/1998 | Lyons | 206/373 |
| 5,836,470 | A | 11/1998 | Neelly et al. | |
| 6,026,685 | A * | 2/2000 | Weterrings et al. | 73/429 |
| 6,554,155 | B1 * | 4/2003 | Beggins | 220/739 |
| 6,588,616 | B1 * | 7/2003 | Ho | 220/4.03 |
| 6,629,622 | B1 | 10/2003 | Abzaletdinov | |
| 6,715,627 | B1 * | 4/2004 | Bonner et al. | 220/4.27 |
| 6,886,703 | B1 * | 5/2005 | Bonner | A47J 47/18 220/23.87 |
| 6,986,437 | B2 | 1/2006 | Jalet et al. | |
| 7,614,516 | B2 * | 11/2009 | Beggins | 215/386 |
| 7,681,755 | B2 * | 3/2010 | Roesler | 220/788 |
| 7,882,953 | B2 * | 2/2011 | Heller et al. | 206/499 |
| 8,074,841 | B1 * | 12/2011 | Craig et al. | 222/129 |
| 8,096,443 | B2 * | 1/2012 | Mattox et al. | 220/788 |
| 8,146,764 | B2 * | 4/2012 | Kral | 220/8 |
| 8,646,640 | B2 * | 2/2014 | Faris | 220/8 |
| 2007/0012696 | A1 * | 1/2007 | Levie | 220/8 |
| 2007/0102429 | A1 | 5/2007 | Shih | |
| 2008/0179323 | A1 * | 7/2008 | Circosta et al. | 220/8 |
| 2009/0120930 | A1 | 5/2009 | Sexton | |
| 2012/0248106 | A1 * | 10/2012 | Marta | 220/8 |
| 2013/0264339 | A1 * | 10/2013 | Oldani et al. | 220/8 |

* cited by examiner

VERTICALLY EXPANDABLE RECEPTACLE

CROSS-REFERENCE TO RELATED APPLICATIONS

The present application claims the benefits of U.S. Provisional Application Ser. No. 61/619,359 entitled "Vertically Expandable Receptacle" filed Apr. 2, 2012, and U.S. Provisional Application Ser. No. 61/656,272 entitled "Round Expandable Receptacle" filed Jun. 6, 2012, the disclosures of which are hereby incorporated by reference herein.

BACKGROUND OF THE INVENTION

Receptacles for trash, recyclables, laundry, or the like are used by virtually everyone in the world. While the classic small, kitchen, and large trash receptacles undoubtedly serve their individual purposes, several situations arise in everyday life that suggests there is a void that can be remedied by an improved receptacle. Indeed, despite the varying array of popular sized receptacles, it is common to find that they are rendered inappropriate for certain uses.

For example, people are often faced with situations where the popular sized thirteen gallon kitchen trash bag simply is not large enough but a large, thirty plus gallon outdoor trash receptacle is too large and does not fit or compliment the kitchen. Surely the reader is aware that when one is hosting a party in their home, the party host typically resorts to affixing a large sized bag to a kitchen cabinet door knob or oven handle. Others tape the large bag to their kitchen countertop or simply allow the bag to rest on their floor. These "solutions" often result in spills due to the bag toppling over or due to a hole in the bag which is not contained in a separate receptacle.

In addition to use while entertaining guests, large trash bags are used indoors during home clean-ups or renovations in the home or office. This leads to a potentially filthy home if the debris makes its way on one's carpet or floor.

In a different respect, people are often faced with a situation where they have a full laundry basket and they desire to delay their trip to the Laundromat or wash machine, or simply, they want to add some extra laundry to the top of their laundry receptacle without having the laundry fall out. An improved receptacle can prove to be the perfect fix to this all too common dilemma as well.

BRIEF SUMMARY OF THE INVENTION

The present invention solves the above dilemmas by providing an expandable receptacle that telescopes vertically and adjusts to different height positions, thus altering the internal volume to accommodate varying use conditions.

In accordance with a first embodiment of the invention, there is provided an expandable receptacle comprising an outer housing having a bottom with upstanding walls extending to an opening. At least one upstanding wall comprises an aperture having a lower stop and an upper stop separated by a reduced cross-sectional area. The receptacle also includes an internal frame comprising upstanding walls, the internal frame adapted to be positioned in a first position in which the internal frame upstanding walls are substantially within the outer housing upstanding walls to create a total internal volume and a second position in which the internal frame upstanding walls are substantially above the outer housing upstanding walls thus increasing the total internal volume of the expandable receptacle. The internal frame further comprises a telescoping assembly, the telescoping assembly comprising a bulb sized and configured to fit the aperture adjacent the lower stop when the expandable receptacle is in the first position and the aperture adjacent the upper stop when the expandable receptacle is in the second position.

The telescoping assembly may comprise a tab cantilevered from a portion of the internal frame. The bulb may be formed on a free end of the cantilevered tab. In order to move the internal frame from the first position to the second position pressure may be placed on the bulb to deform the cantilevered tab and move the bulb from restriction of the reduced cross-sectional area. Typically this action will move the bulb inward toward the internal volume of the receptacle.

The outer housing aperture may be substantially hourglass shaped.

The expandable receptacle may further comprise a flip lid connected by a hinge to the internal frame. The expandable receptacle may also further comprise at least one perimeter hook adapted to secure the flip lid to the internal frame.

The expandable receptacle may further comprise a flip lid connected by a hinge to the internal frame where the flip lid further comprises a push lever opposite the hinge, the push lever adapted to secure the flip lid in a closed position.

In accordance with a second embodiment of the invention, there is provided an expandable receptacle comprising a generally cylindrical and hollow main receptacle having a bottom edge, the main receptacle including an inner element and an outer element offset by a stepped portion, the outer element being adjacent to the bottom edge, the stepped portion forming a collar rest edge at a first height relative the bottom edge and a collar rest platform at a second height higher than the first height. A generally cylindrical and hollow telescoping collar has a base, the telescoping collar being adapted to fit over the inner element such that the base may rest on the collar rest edge in a first position or the collar rest platform in a second position. The combined inner volume of the main receptacle and the telescoping collar is less in the first position than the second position.

The expandable receptacle may further comprise a ramp portion on the stepped portion between the collar rest edge and the collar rest platform.

The expandable receptacle may further comprise a locking orifice on the telescoping collar and a locking tab on the inner portion, the locking tab fitting within the locking orifice when the receptacle is in the second position.

The telescoping collar and the collar rest platform may be separated by a gap when the receptacle is in the first position.

The expandable receptacle may further comprise a lid assembly, wherein a refuse bag may be trapped between the lid assembly and the inner element when the receptacle is in the first position and the lid assembly and the telescoping collar when the receptacle is in the second position. The second position of the receptacle may support a larger refuse bag than the first position of the receptacle and the larger refuse bag may be viewable from the exterior of the receptacle while the small bag is not.

The expandable receptacle may further comprise a lid assembly, wherein a refuse bag may be trapped between the lid assembly and the inner element when the receptacle is in the first position and the lid assembly and the telescoping collar when the receptacle is in the second position, where the inner element includes bag mounting reliefs at an upper portion thereof.

The telescoping collar may be rotated approximately 90 degrees between the first position of the expandable receptacle and the second position.

The expandable receptacle may further comprise a grip on the telescoping collar for facilitating handling thereof.

The expandable receptacle may further comprise a second collar rest edge and a second collar rest platform. The expandable receptacle may also further comprise a second locking orifice and a second locking tab.

BRIEF DESCRIPTION OF THE DRAWINGS

The subject matter regarded as the invention is particularly pointed out and distinctly claimed in the concluding portion of the specification. The invention, however, both as to organization and method of operation, together with features, objects, and advantages thereof, will be or become apparent to one with skill in the art upon reference to the following detailed description read with the accompanying drawings. It is intended that any additional organizations, methods of operation, features, objects or advantages ascertained by one skilled in the art be included within this description, be within the scope of the present invention, and be protected by the accompanying claims.

With respect to the drawings.

DETAILED DESCRIPTION

Figure 1:
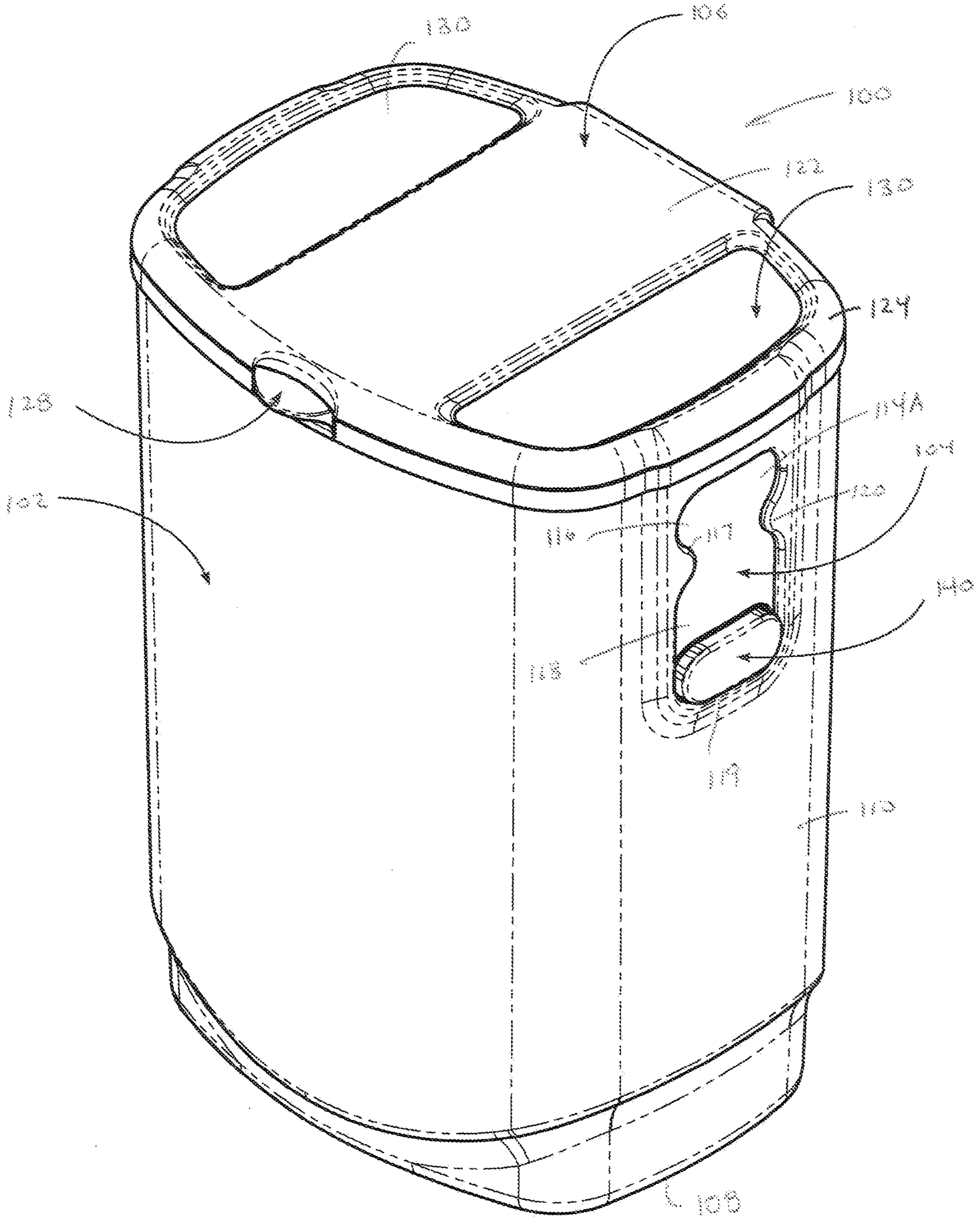
FIG. 1 is an isometric view of an expandable receptacle in accordance with a first embodiment of the present invention.

In the following are described the preferred embodiments of the vertically expandable receptacle of the present invention. In describing the embodiments illustrated in the drawings, specific terminology will be used for the sake of clarity. However, the invention is not intended to be limited to the specific terms so selected, and it is to be understood that each specific term includes all technical equivalents that operate in a similar manner to accomplish a similar purpose. Where like elements have been depicted in multiple embodiments, identical reference numerals have been used in the multiple embodiments for ease of understanding.

Directional terminology, such as “top”, “bottom”, “front”, “side”, “isometric”, etc., is used with reference to the orientation of the figure(s) being described. Because components of embodiments of the present invention can be positioned in a number of different orientations, the directional terminology is used for purposes of illustration and is in no way limiting.

Moreover, the final sizes and volumes of the receptacles embodied herein are completely variable. For example, a single receptacle may be sized in the popular 8 gallon size while in one configuration and in the popular 13 gallon size in a second configuration. Other alternatives include 4 gallon to 8 gallon or 13 gallon to 30 gallon. Still other alternatives, whether in popular denominations or not, could also be manufactured.

FIG. 1 shows an isometric view of receptacle 100, which may be any receptacle such as a trash or laundry bin, in its recessed state. In this state, the internal volume of the receptacle 100 is minimized. At times in this disclosure the position represented by FIG. 1 may be referred to as a first position.

Figure 9:
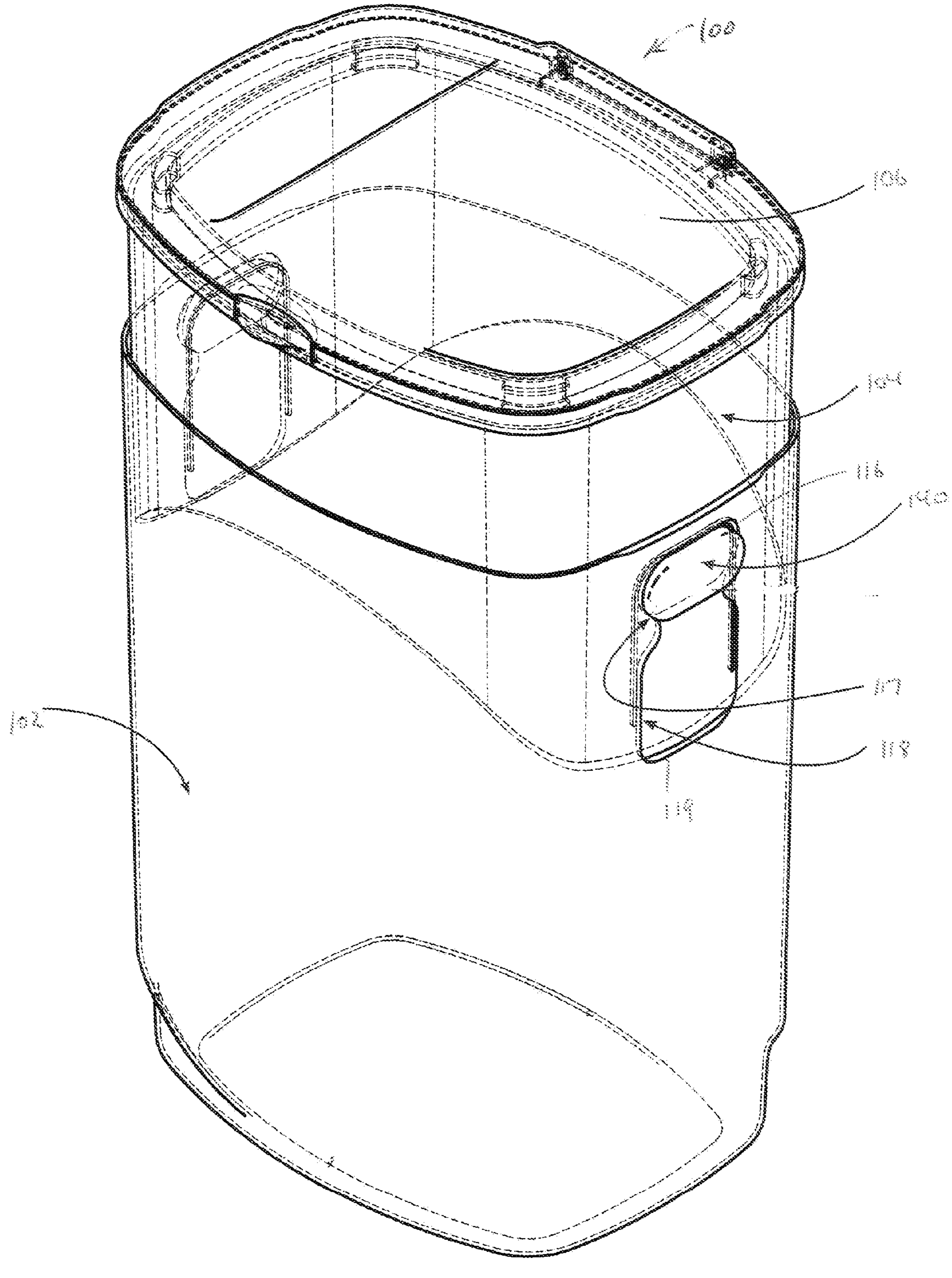
FIG. 9 is a isometric view of the expandable receptacle in a secondary position thereof displaying maximum internal capacity.

FIG. 9 shows an isometric view of the receptacle 100 in an expanded, or second position, where the internal volume of the receptacle is maximized. It will be appreciated that either position may be the preferred position for a particular receptacle 100, but generally the first position is most preferred such that the receptacle may be expanded only when needed. Moreover, although the receptacle 100 is shown in two possible positions, it will be appreciated that in other embodiments a receptacle may be engineered and manufactured for any number of intermediate positions. As a practical matter however, it is preferred that the maximum number of positions be three.

The receptacle 100 comprises three major components, an outer housing 102, an internal frame 104, and a flip lid 106. Moving briefly to FIG. 8, it will be appreciated that the flip lid 106 attaches to the internal frame 104 in a generally conventional manner. It will also be appreciated that the internal frame is configured to slide substantially into the outer housing 102 to the position shown in FIG. 1.

Although shown in FIG. 1 as a generally rectangular receptacle with rounded edges, the outer housing 102 may be configured to a variety of shapes, such as cylindrical or oval. Most operative is that it contain a bottom 108, preferably a closed bottom, with upstanding walls 110 terminating with an opening 112 (see FIG. 8). However, the bottom may also be open. Additionally, the outer housing 102 features at least one aperture, and in the embodiment shown a pair of apertures 114A, 114B, for use in conjunction with the internal frame 104 as will be discussed to aid in moving the interior frame 104 from the first position to the second position and vice-versa.

The apertures 114A, 114B featured in the embodiment shown in FIG. 1 are generally hour-glass shaped and include an upper section 116 and a lower section 118 separated by a separation section 120 of diminished cross-sectional area. The upper section 116 and lower section 118 are configured to provide an upper stop 117 and lower stop 119. The purposes of these sections will become apparent to one of ordinary skill in the art in later sections of this disclosure, but it will be appreciated that components associated with the internal frame 104 may travel between the upper section 116 and lower section 118 depending on the configuration of the receptacle 100 required, thus altering the internal volume of the receptacle.

Figure 11:
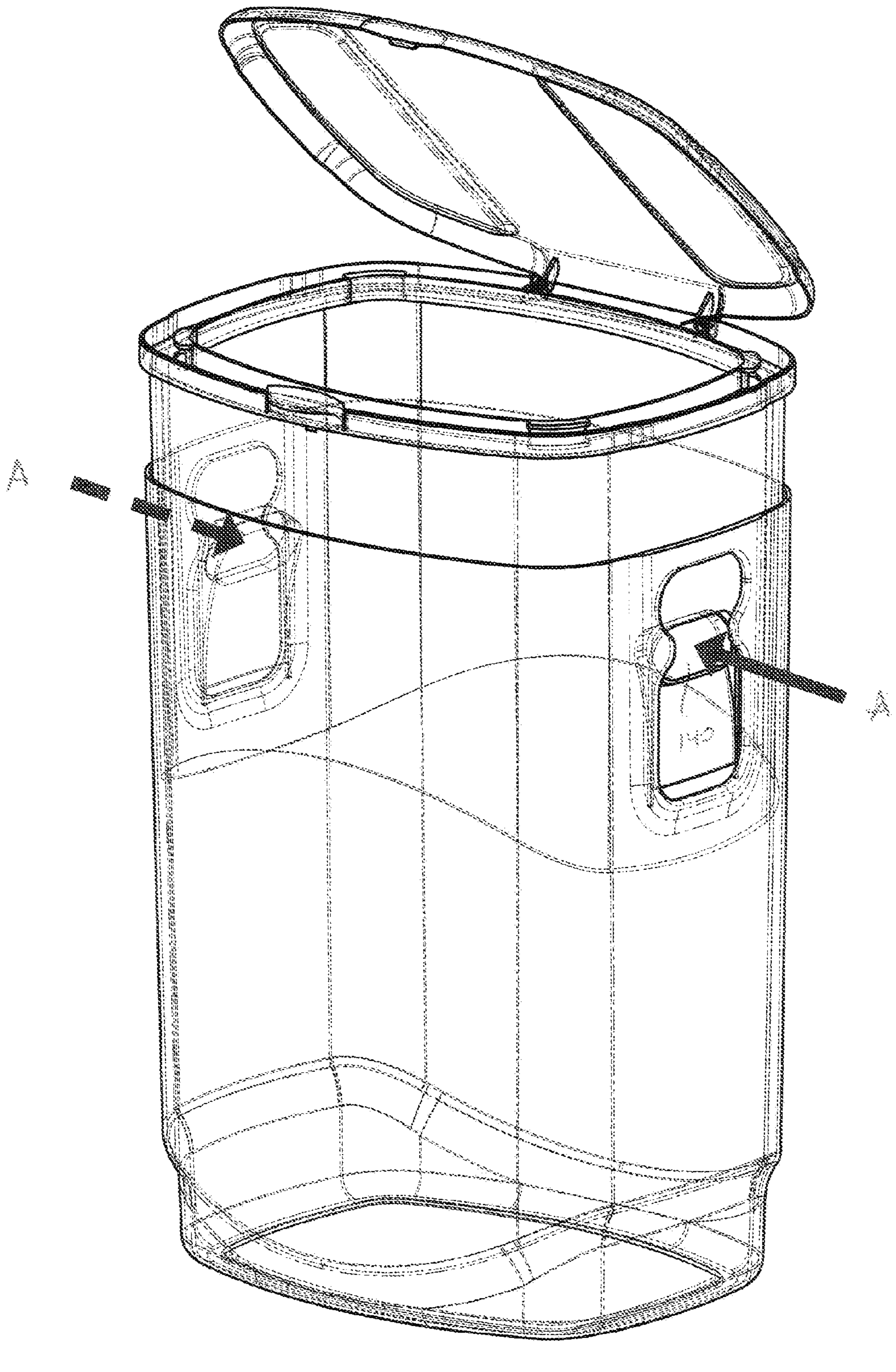
FIG. 11 is an isometric view of the receptacle of FIG. 1 displaying a representation of the cantilevered action of the internal frame telescoping assembly.

The flip lid 106 featured in the embodiment of FIG. 1 is generally configured as a flat, planar lid 122 with a downturned edge 124. The downturned edge 124 is sized and configured to enclose the opening 112 of the outer housing 102 to preferably form a tight seal ensuring that the contents of the receptacle 100 do not exude an undesirable odor. The flip lid 106 is attached to the interior frame 104 with a conventional hinge assembly 126 that is preferably spring actuated. The preferred hinge assembly 126 defaults to an open position such as shown in FIG. 11 revealing the contents of the receptacle 100. A push lever 128 is provided on the flip lid 106 opposite to the hinge assembly 126 to secure or lock the flip lid in the closed position as shown in FIG. 1. Of course, other lid provisions, including the provision of no lid, may be provided.

The flip lid 106 may also be provided with one or more recesses 130 which may serve functional purposes of allowing items to stack on the flip lid, aesthetic purposes, or both.

Figure 2:
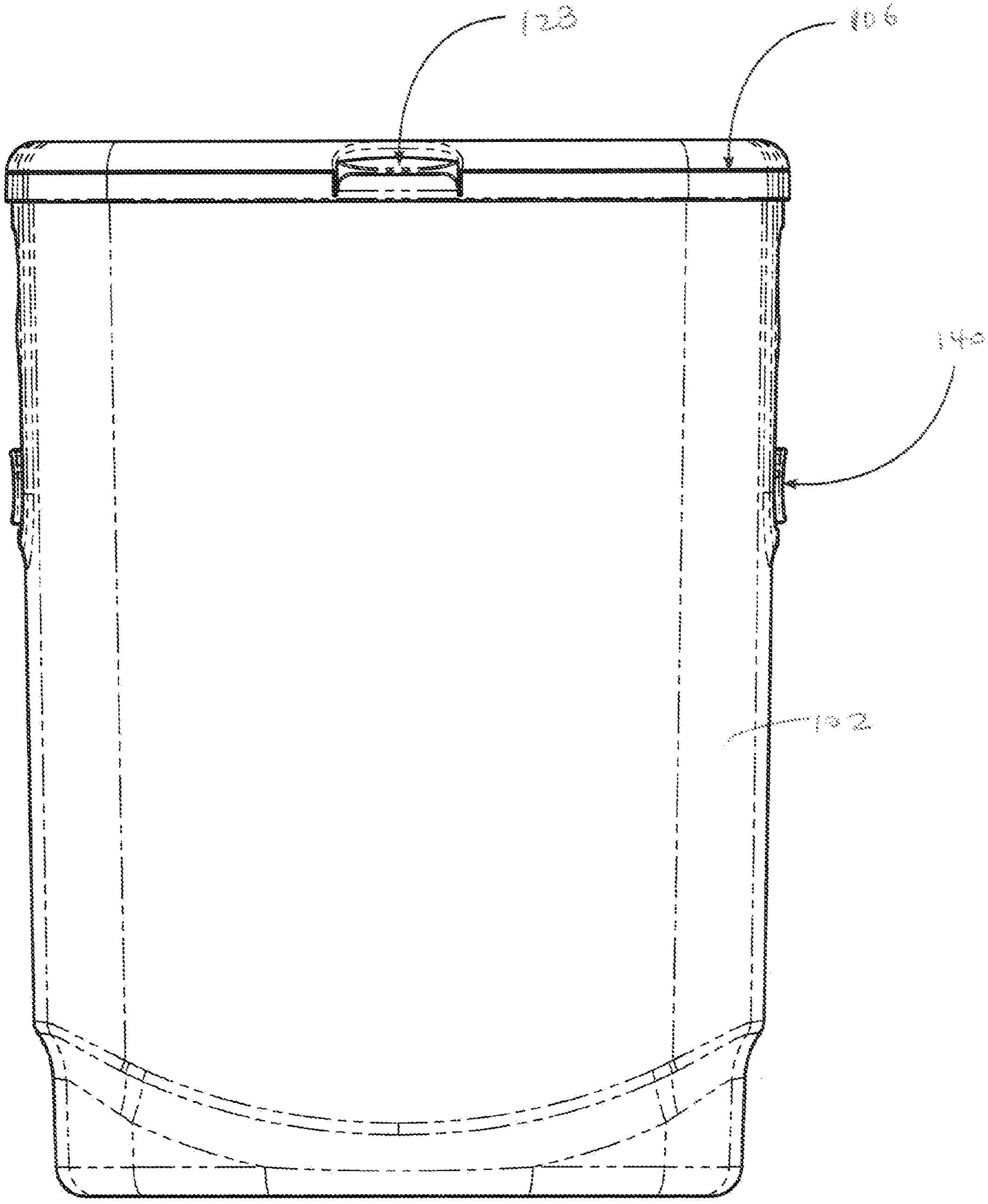
FIG. 2 is a front view thereof.
Figure 3:
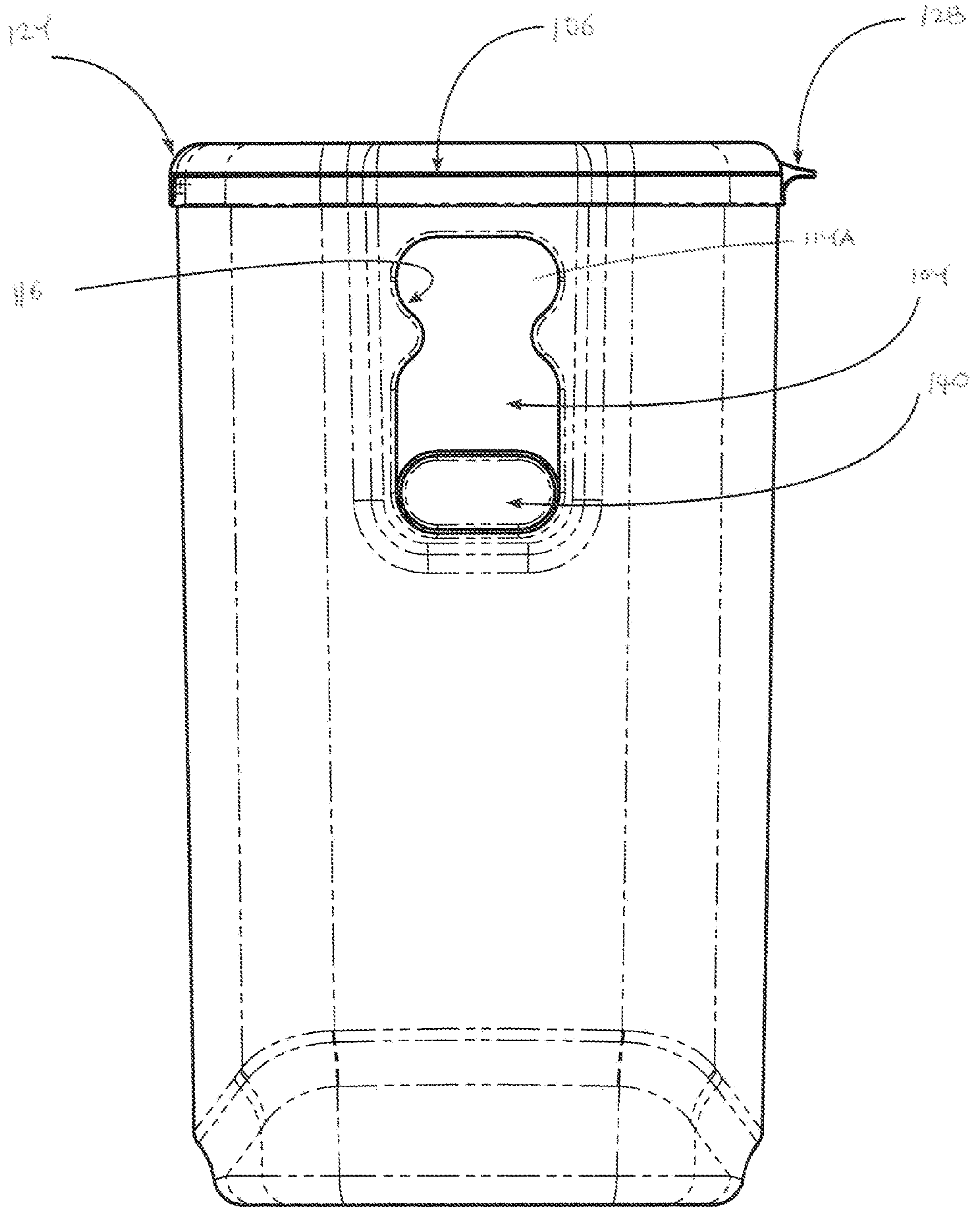
FIG. 3 is a side view thereof.
Figure 4:
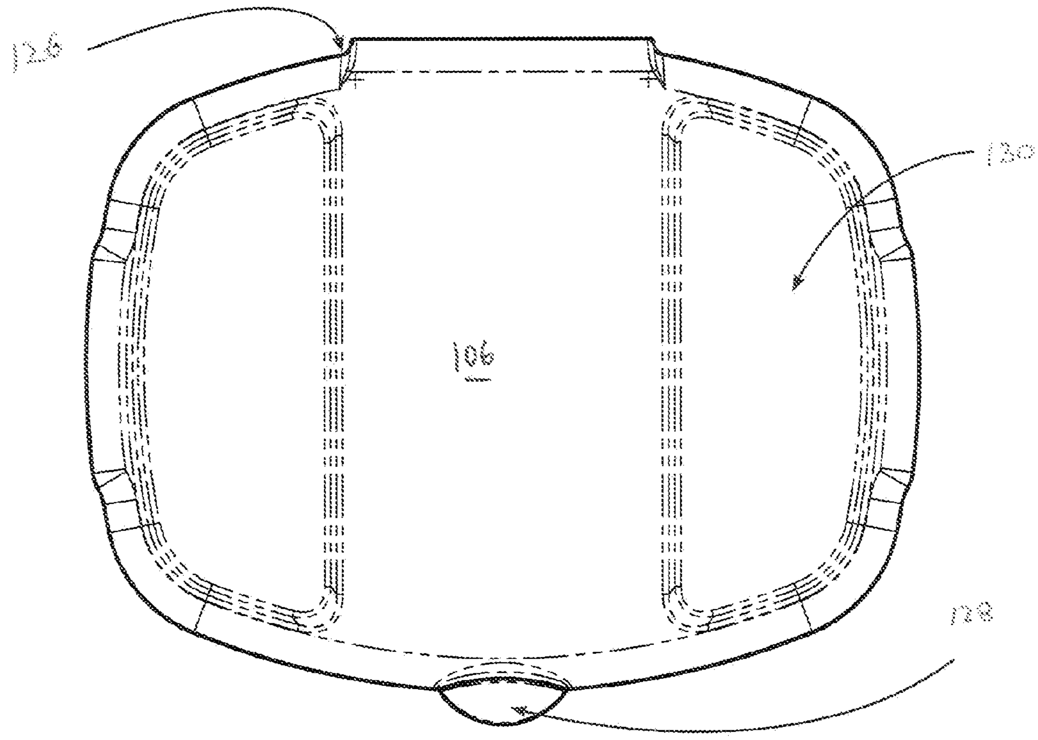
FIG. 4 is a top view thereof.
Figure 5:
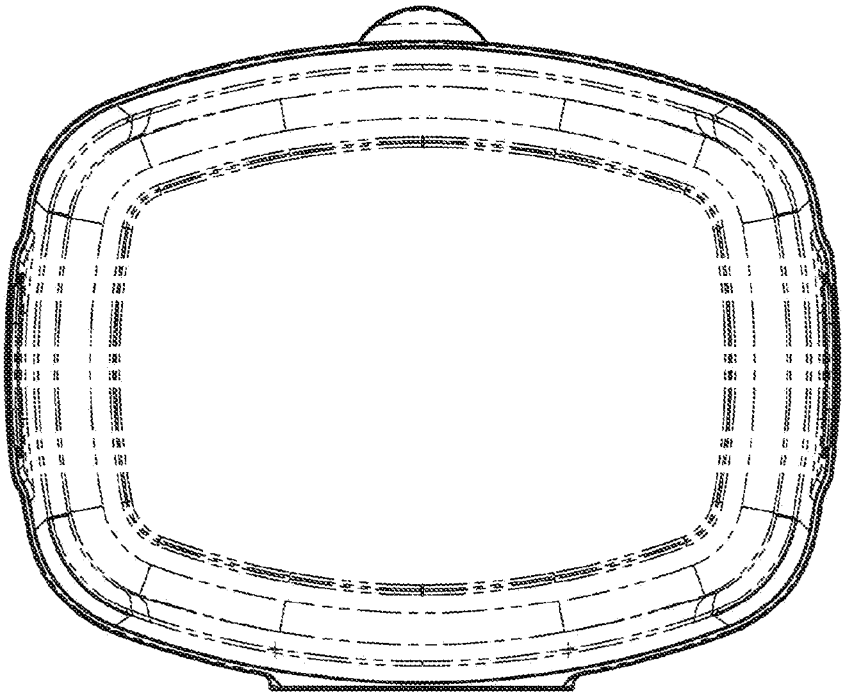
FIG. 5 is a bottom view thereof.

FIG. 2 illustrates a front view of the receptacle 100 of FIG. 1. FIG. 3 displays a side view of the receptacle 100 where the hour-glass shape of the aperture 114A can clearly be seen. FIG. 4 shows a top view of the receptacle 100 and FIG. 5 is a bottom view thereof.

Figure 6:
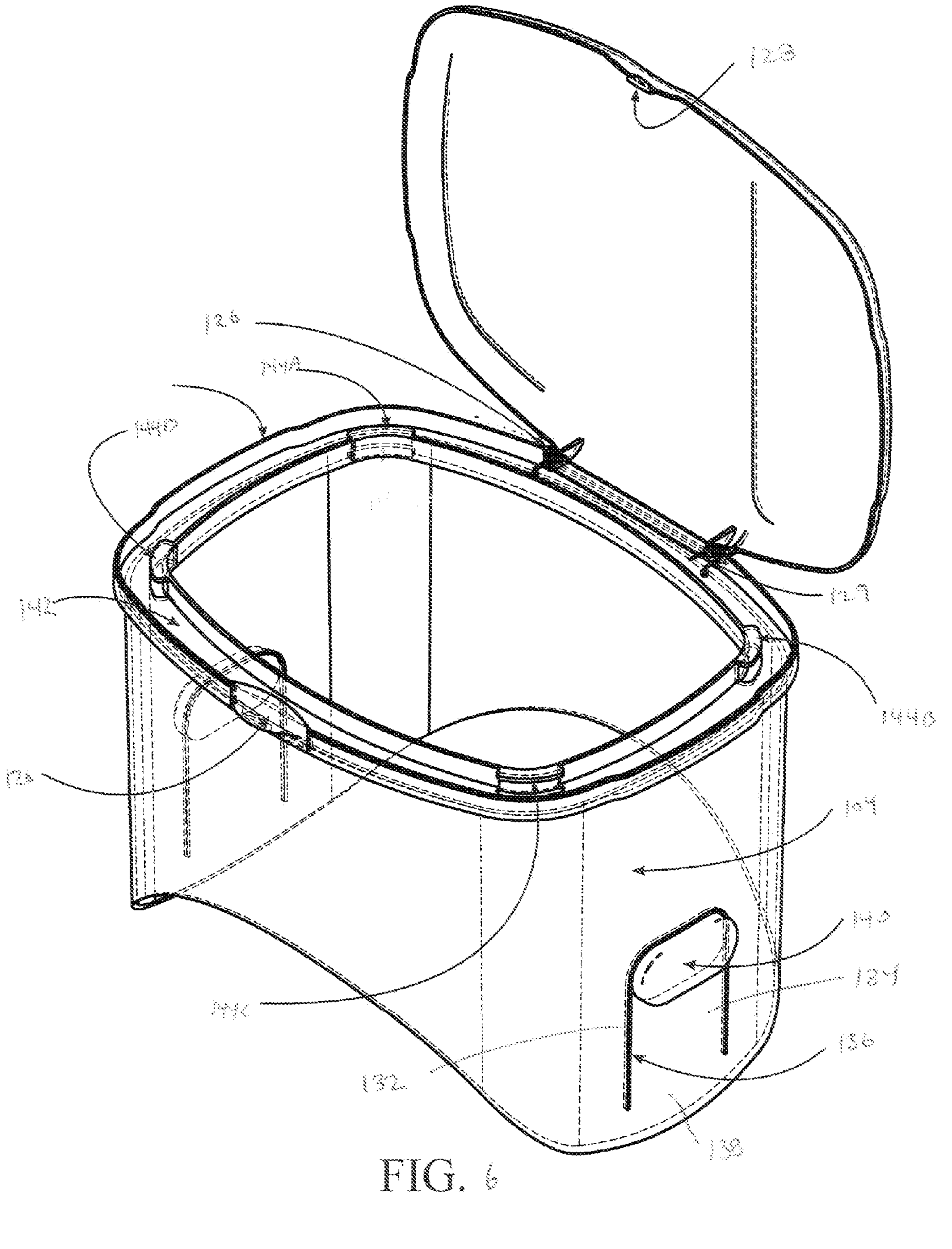
FIG. 6 is an isometric view of the internal frame and flip lid forming portions of the expandable receptacle of FIG. 1.

Referring to FIG. 6, there is illustrated an isometric view of the internal frame 104 and flip lid 106 in an open position. That is, the push lever 128 has been released to unlock the flip lid and permit its rotation about hinge assembly 126 to the open position by action of springs 129 located on opposite sides of the hinge assembly.

FIG. 6 also displays the telescoping assembly 132 of the internal frame 104. As shown, the telescoping assembly 132 comprises a tab 134 formed by virtue of a continuous slot 136 being cut or otherwise manufactured into the internal frame 104. The continuous slot 136 forms three sides of a rectangle leaving a cantilevered spring section 138 uncut. Opposite the cantilevered spring section 138 is a bulb 140 extending outwardly from the tab 134. It will be appreciated that when pressure is applied to the bulb 140, such as by it being pressed by the human hand, the tab 134 will deform at the spring section 138 and cantilever into the internal volume of the internal frame 104. Moving briefly to FIG. 11, it will be appreciated that such movement in combination with sliding of the internal frame 104 either upward or downward within the outer housing 102 (as the case may be) will serve to permit the bulb 140 to travel beyond the reduced cross-sectional area 120 of the aperture 114 from one stop to the other. On its movement from one position to the other, the bulb 140 can aid in lifting or lowering the internal frame 104 by its camming against the back of the reduced cross-sectional area 120.

FIG. 6 also displays ring 142 that forms a portion of the internal frame 104 (in the displayed embodiment the ring 142 is a separate element but the ring may also be formed integrally with the internal frame 104). This ring 142 provides rigidity for the receptacle 100 by locking together the external housing 102 and inner frame 104. The ring 102 also serves to bridge between the upper perimeters of the internal frame 142 and outer housing 102 for aesthetic purposes. Hooks 144A, 144B, 144C, and 144D may be implemented to allow the ring 142 to rest securely while in its recessed state if corresponding slots are provided.

To utilize a bag such as a refuse bag with the receptacle 100, a user may place the open end of the bag either under or over the ring 142 in the conventional manner.

Figure 7:
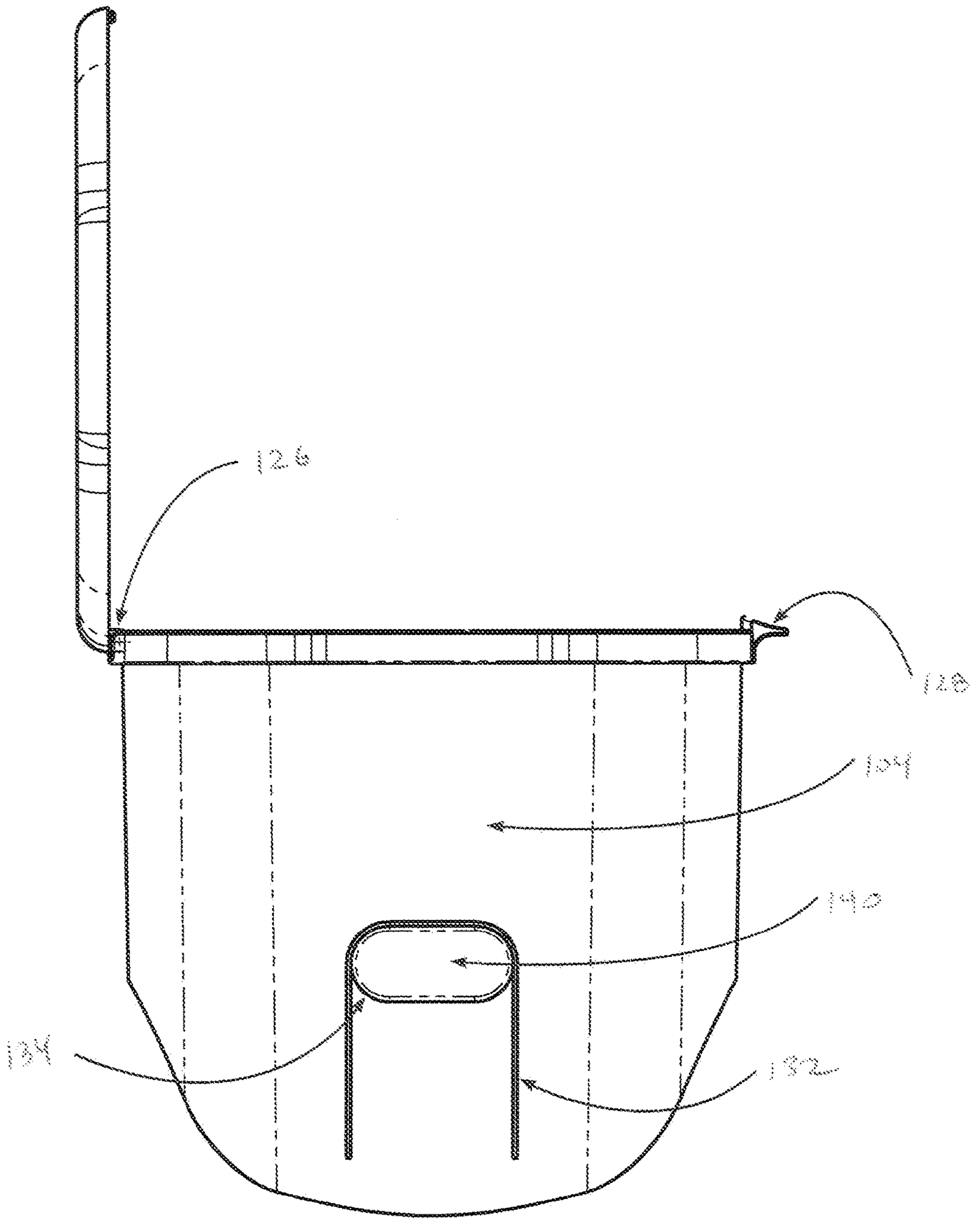
FIG. 7 is a side view of the internal frame and flip lid of FIG. 6.
Figure 8:
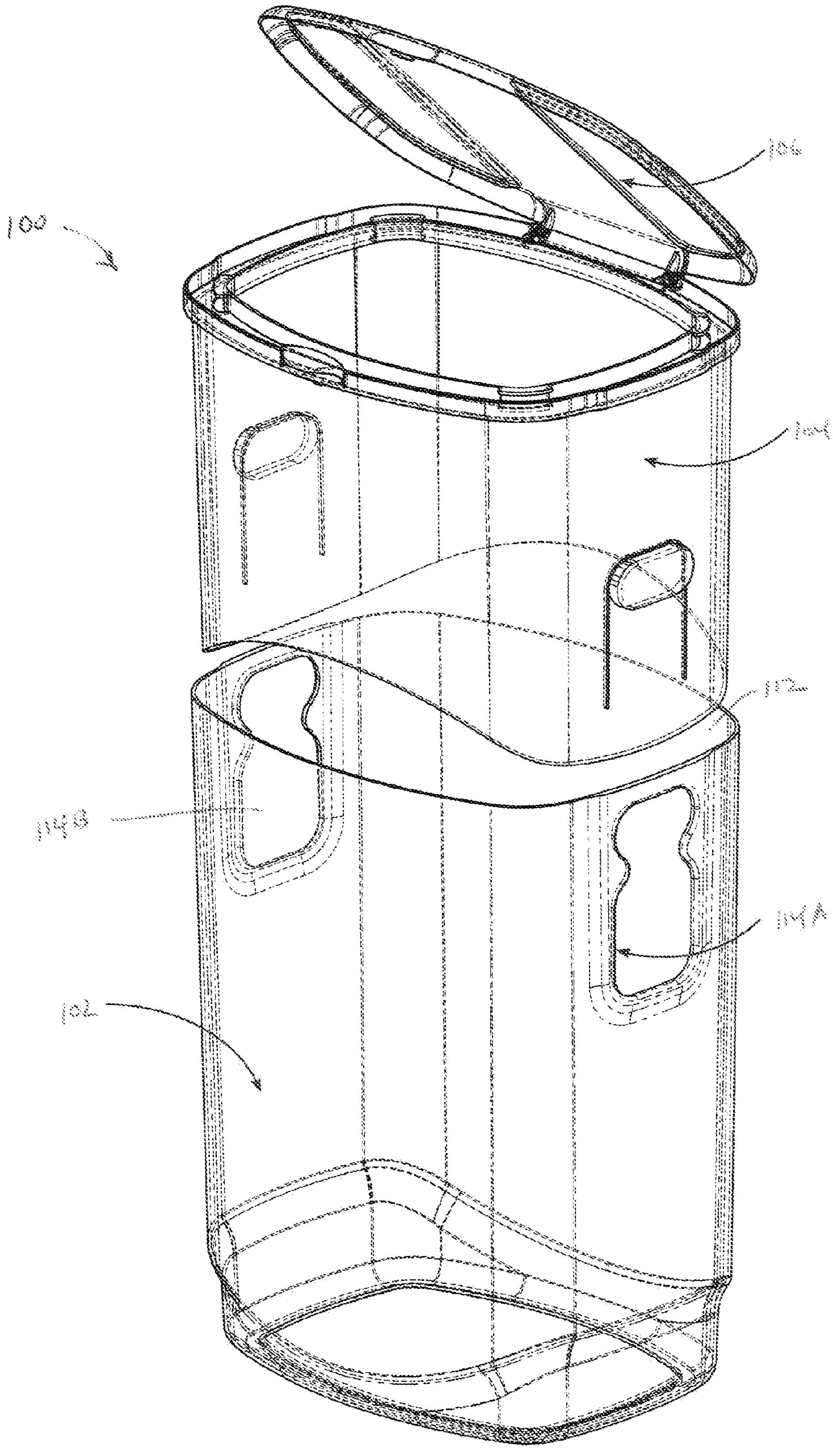
FIG. 8 is a partially exploded view of the expandable receptacle of FIG. 1.
Figure 10:
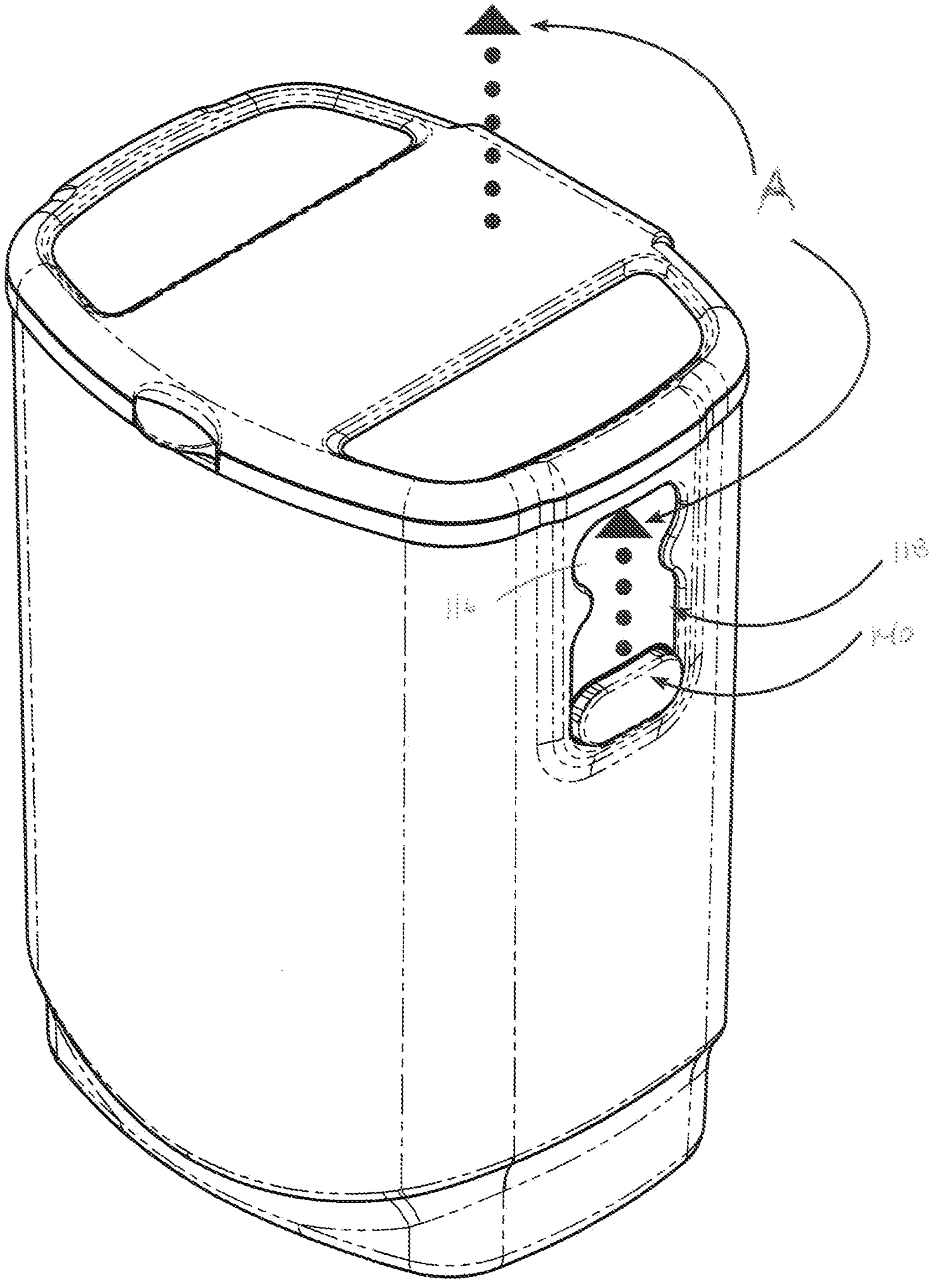
FIG. 10 is an isometric view of the receptacle of FIG. 1 displaying a representation of the telescoping movement.
Figure 12:
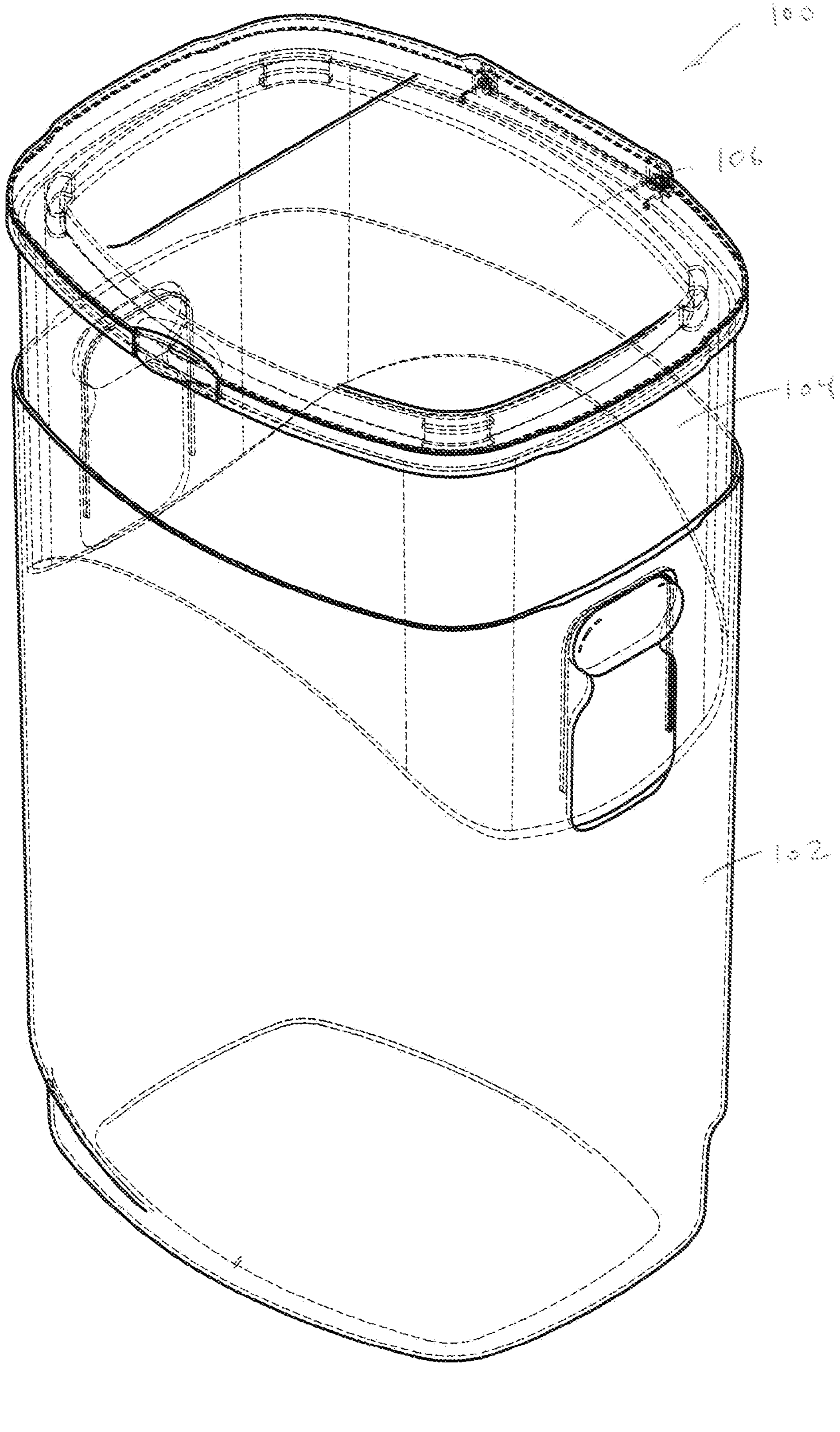
FIG. 12 is an isometric view of the receptacle of FIG. 1 displayed in the secondary position.

FIG. 7 displays a side view of the inner frame 104 and flip lid 106. FIG. 8 demonstrates a partially exploded view of receptacle 102. FIG. 9 shows the expandable receptacle 100 in its secondary position where internal volume is maximized. FIG. 10 is demonstrative of the telescoping movement of the expandable receptacle 100, the movement being along arrow A. Upon pushing the bulb 140 inward along arrow A (see FIG. 11) and raising it along the aperture 114A, the receptacle 100 may be expanded. FIG. 12 demonstrates the bulb 140 locked in the secondary position of the expandable receptacle 100.

Figure 13:
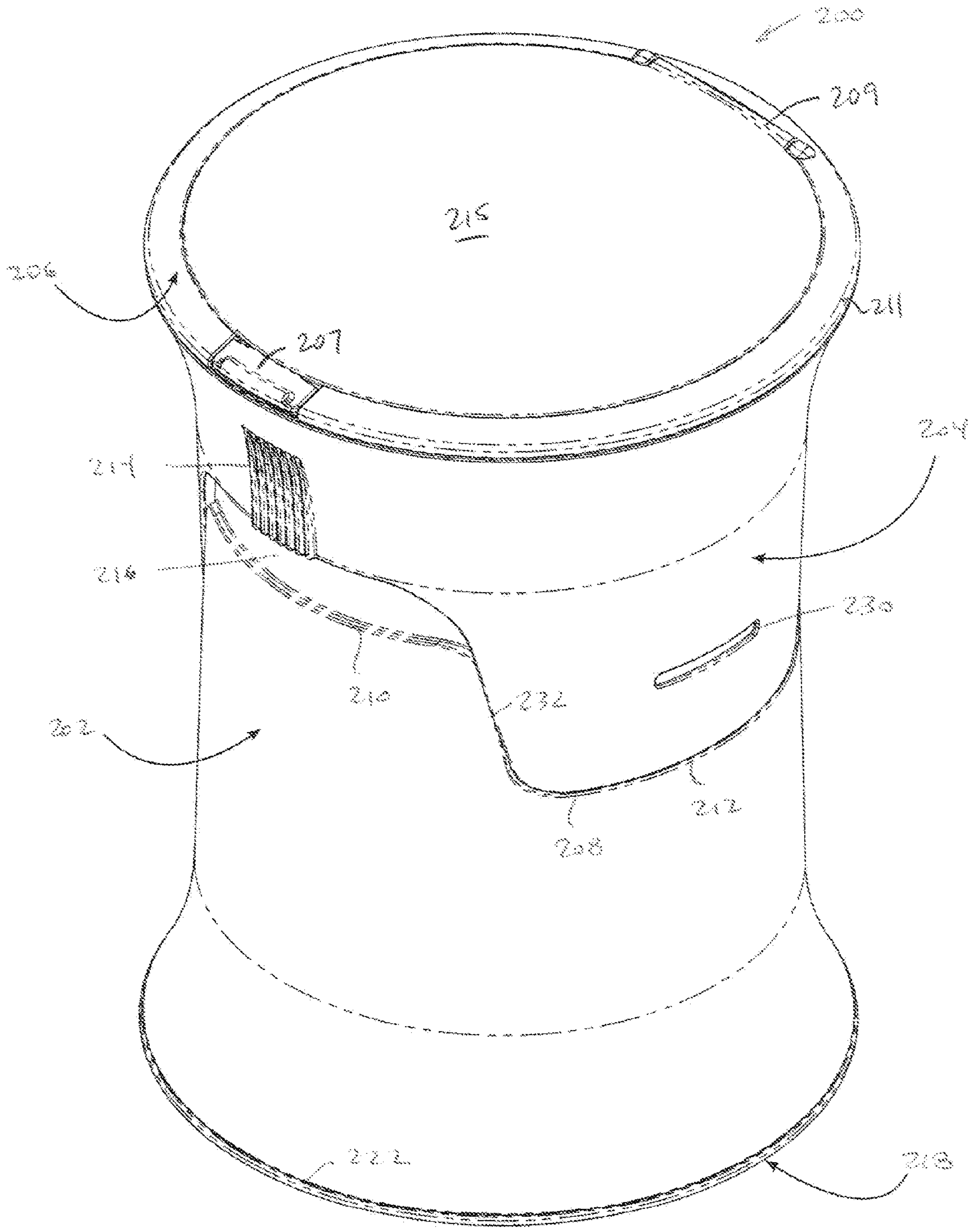
FIG. 13 is an isometric view of an expandable receptacle in accordance with a second embodiment of the present invention.
Figure 14:
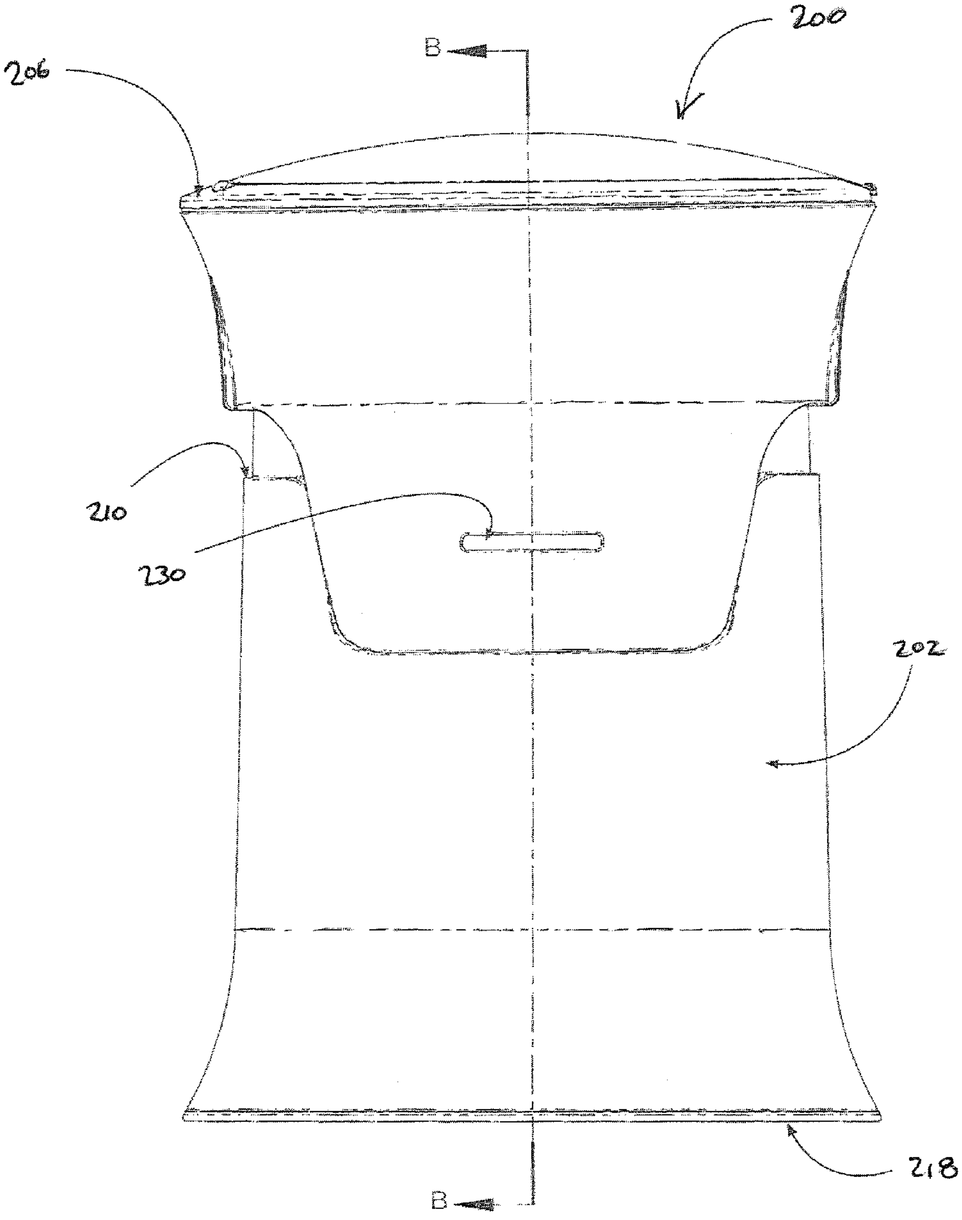
FIG. 14 is a front view thereof.
Figure 15:
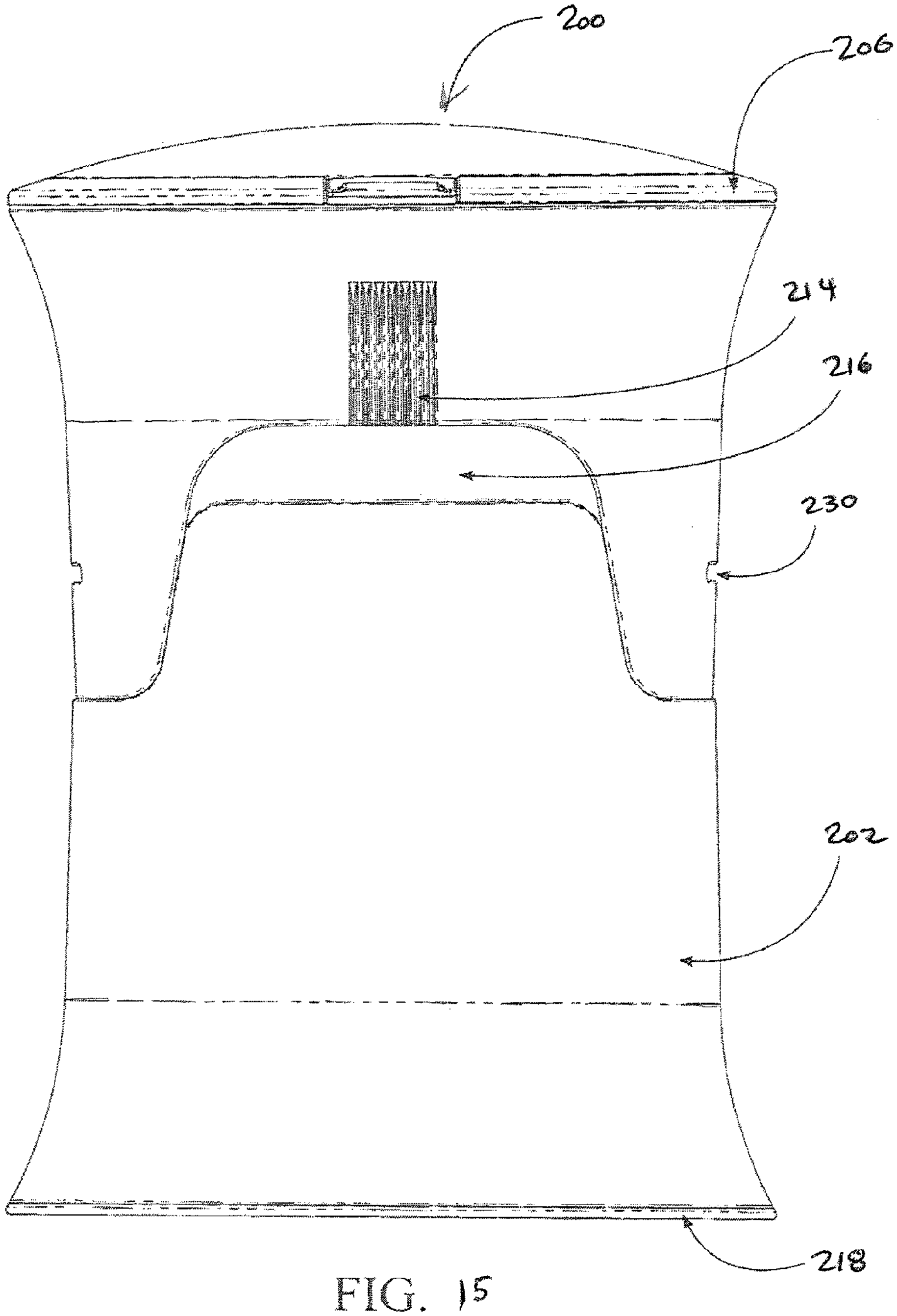
FIG. 15 is a side view thereof.

FIG. 13 shows an isometric view of a receptacle 200 in accordance with a second embodiment of the present invention. In accordance with this embodiment, the receptacle 200 is generally cylindrical. Operation of the receptacle from a first position to a second position is also different from that of the first embodiment.

In this second embodiment, the receptacle includes a main receptacle 202 which forms the base of the unit and generally corresponds to the outer housing of the prior embodiment. The receptacle 200 also includes a telescoping collar 204 which provides the means for expanding the receptacle. Lastly, the receptacle 200 includes a flip lid assembly 206.

Figure 16:
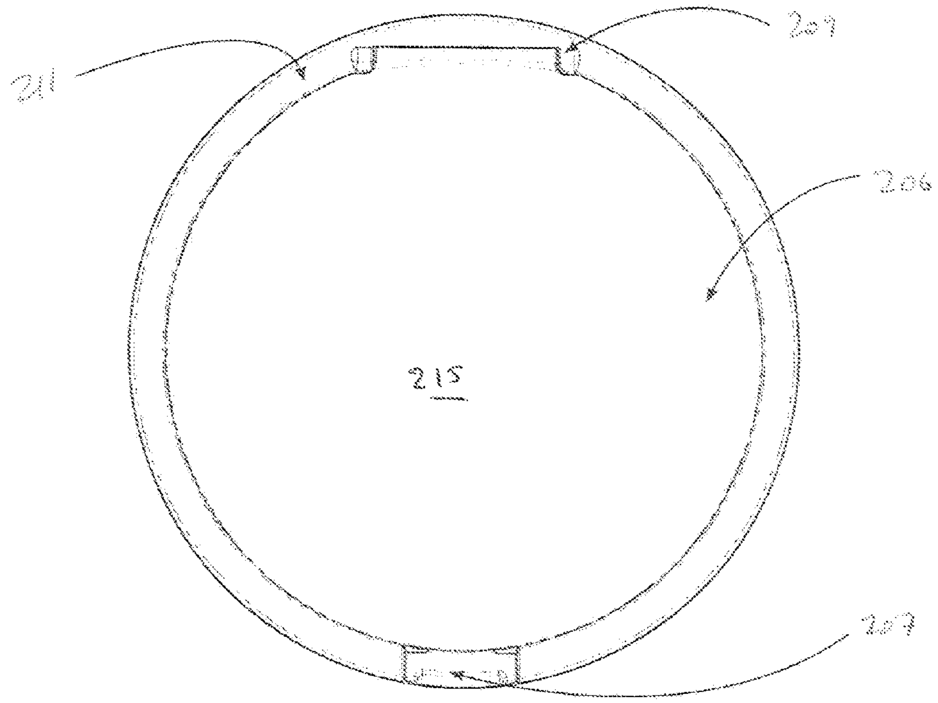
FIG. 16 is a top view thereof.
Figure 17:
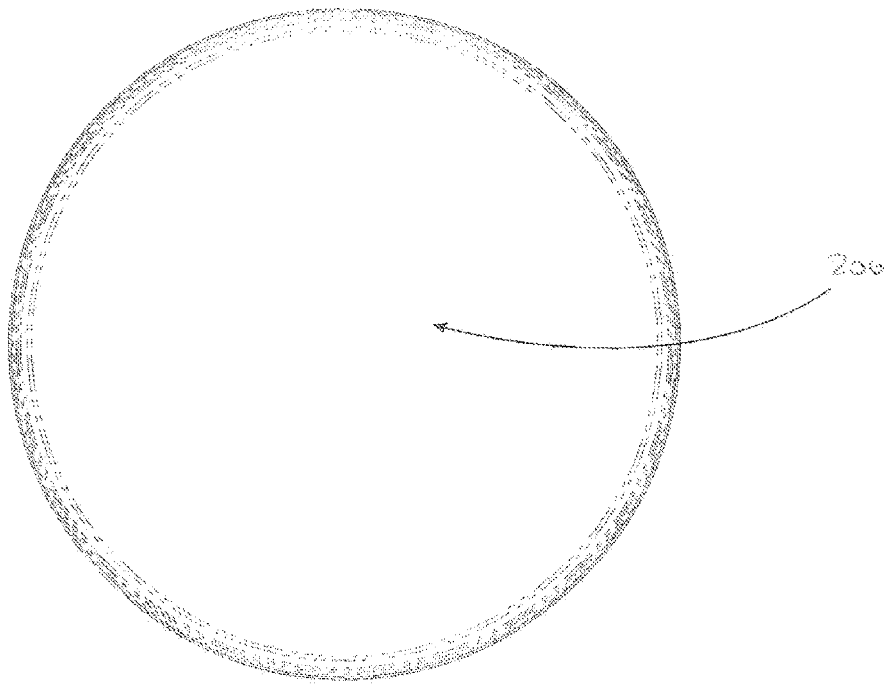
FIG. 17 is a bottom view thereof.
Figure 18:
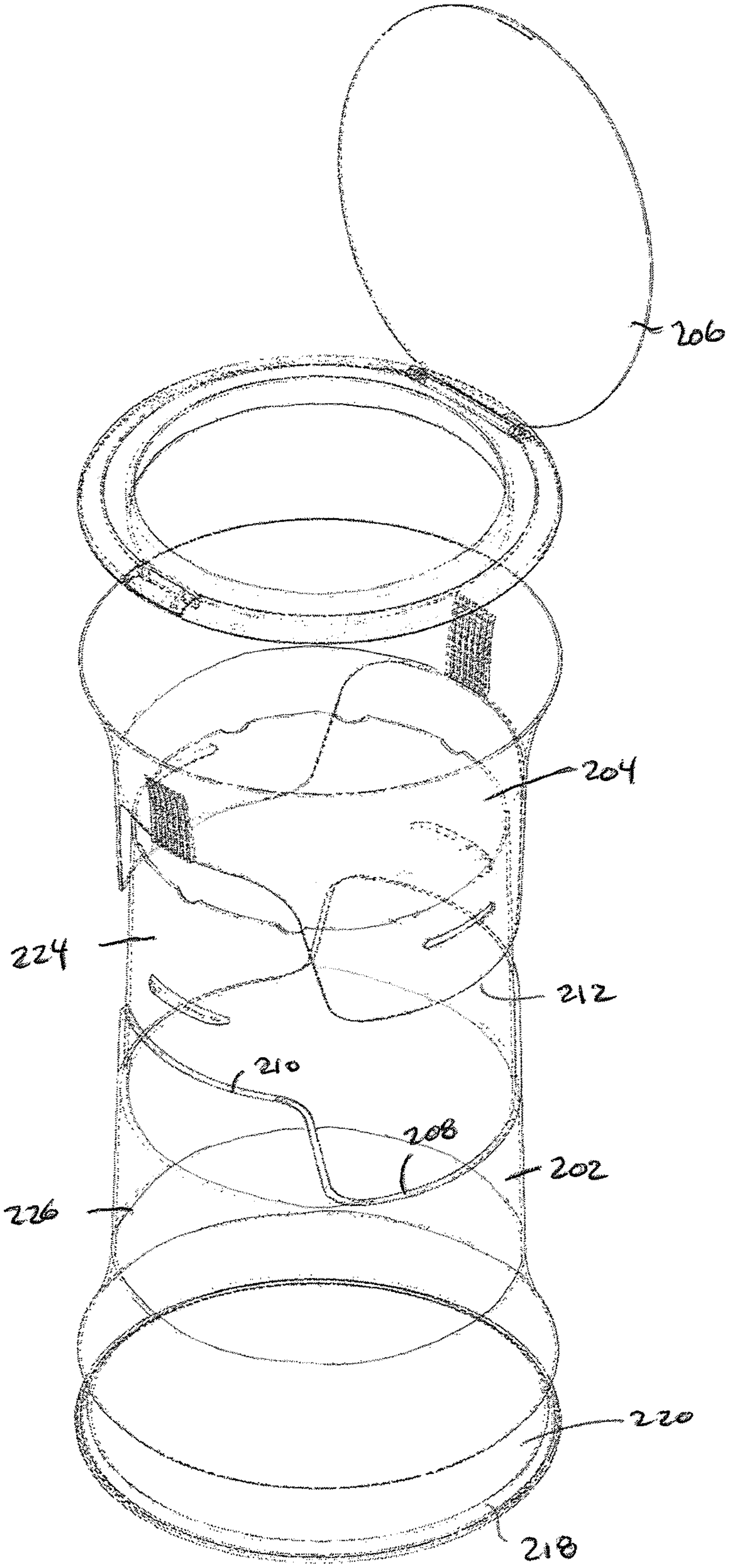
FIG. 18 is an exploded isometric view thereof.
Figure 19:
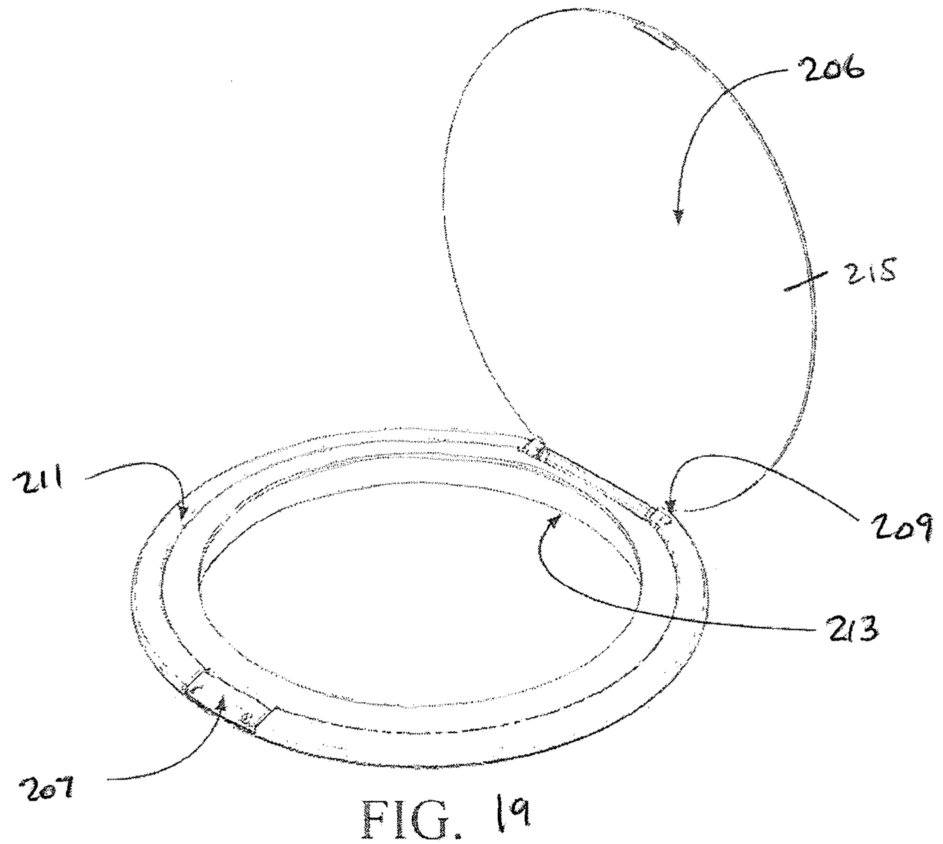
FIG. 19 is an exploded view of the flip lid assembly of the expandable receptacle of FIG. 13.
Figure 20:
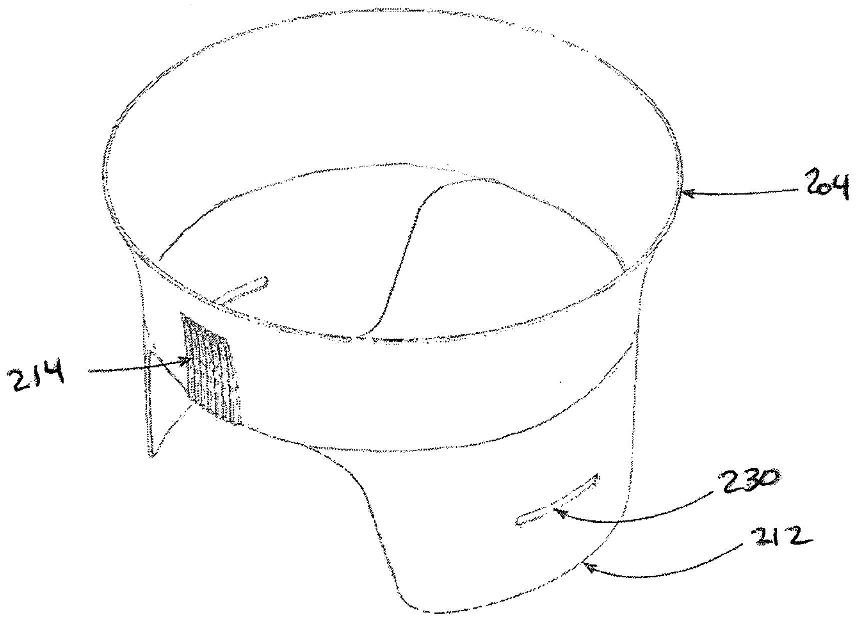
FIG. 20 is an isometric view of the telescoping collar of the expandable receptacle of FIG. 13.

The flip lid assembly 206 includes a locking handle 207, and a hinge 209 opposed from the locking handle. Also included is a perimeter extension 211 that covers the upper portion of the telescoping collar 204 to create a tight seal. These features are shown in FIG. 16. As shown in FIG. 19, the flip lid assembly 206 also includes an inner flange 213. The inner flange 213 is turned downward from the planar flip lid 215. As will be shown, this inner flange 213 aids in supporting a bag within the container 200.

As shown in FIG. 13, the telescoping collar 204 is supported on the main receptacle 202. In the embodiment shown the receptacle is capable of two configurations. However, in other embodiments a greater number of configurations are possible. For the present embodiment, it will be appreciated that the main receptacle 202 includes a collar rest edge 208 for supporting the telescoping collar 204 when the receptacle 200 is in the smaller of the two configurations and a collar rest platform 210 for supporting the telescoping collar when the receptacle is in the larger of the two configurations. (The embodiment shown depicts a pair of collar rest edges 208 and a pair of collar rest platforms 210 although for clarity only one of each is discussed herein. In some embodiments of the invention, there may only be one collar rest edge 208 and one collar rest platform 210.) As will be discussed, to move the telescoping collar 204 and thus the receptacle 200 between the two positions, one must turn the telescoping collar approximately 90 degrees and either lift it from the collar rest edge 208 to the collar rest platform 210 or lower it from the collar rest platform to the collar rest edge. Appreciably the telescoping collar 204 is provided with a base 212 for resting on either the collar rest edge 208 or collar rest platform 210.

As also shown in FIG. 13, the receptacle 200 includes a grip 214 on the telescoping collar 204. The grip 214 helps a user to handle the telescoping collar 204 and may be formed as a portion of the telescoping collar or may be a separate element glued or physically attached to the telescoping collar. Lastly, it is also noted that there exists a gap 216 between the telescoping collar 204 and main receptacle 202 in the area of the grip 214 in the embodiment and position shown. This gap 216 also assists a user in grasping the telescoping collar 204 by providing a place for the hand to slip under the telescoping collar.

Figure 22:
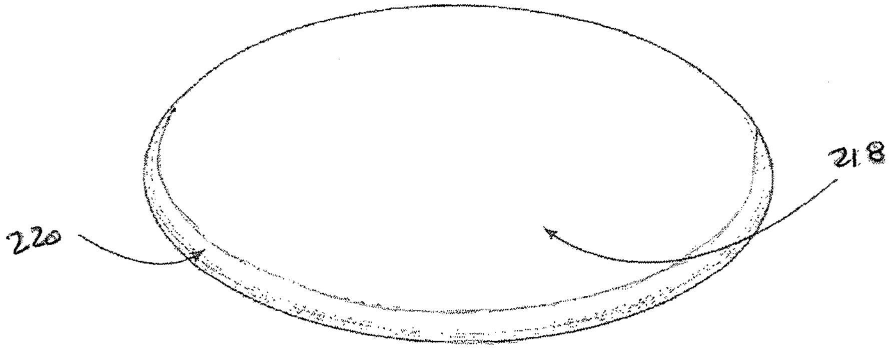
FIG. 22 is an isometric view of the bottom cap of the expandable receptacle of FIG. 13.

FIG. 13 also depicts a bottom cap 218. As shown in FIG. 22, the bottom cap 218 includes a continuous pressure fit wall 220 that can be fitted into the base 222 of the main receptacle 202.

Figure 21:
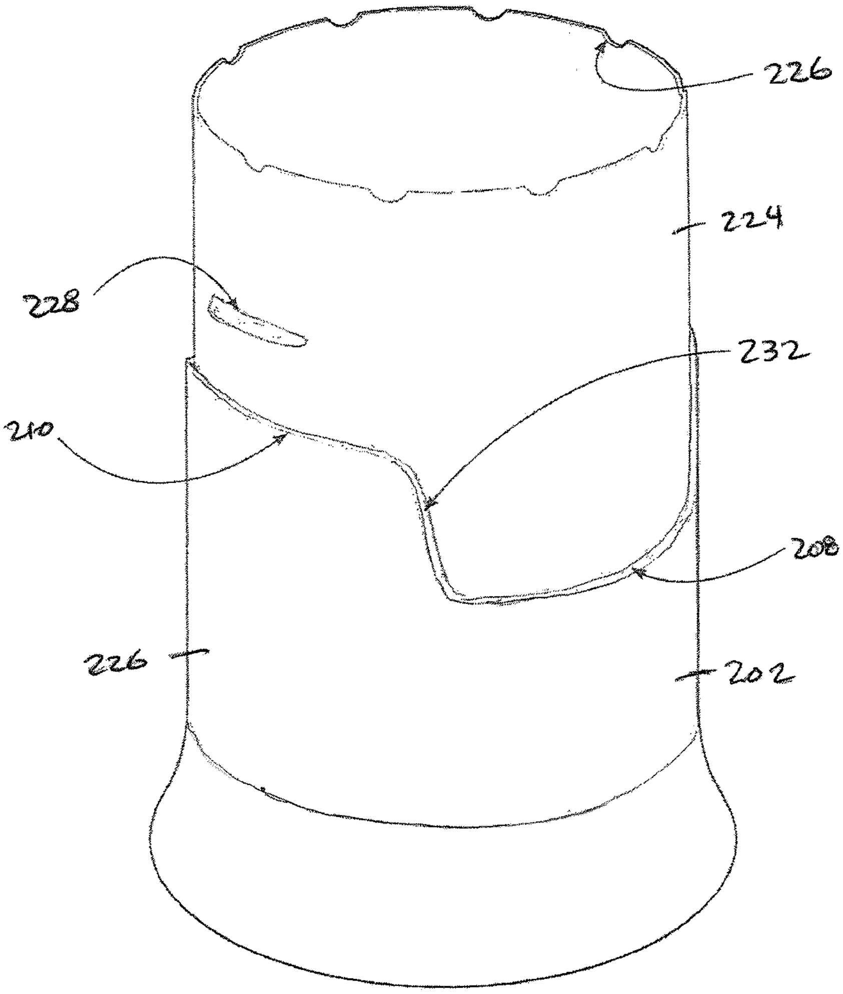
FIG. 21 is an isometric, transparent view of the main receptacle of the expandable receptacle of FIG. 13.

Moving briefly to FIG. 21, there is shown an isometric view of the main receptacle 202. Here it can be seen that the main receptacle 202 is stepped to form an inner element 224 and outer element 226 offset by step 234. It is the outer element 226 that is open at the bottom to permit fitting of the bottom cap 218.

Still at FIG. 21, it can be seen that the upper edge of the inner element 224 is provided with bag mounting reliefs 226, here shown as a series of scallops. The bag mounting reliefs 226 provide locations for a bag, such as a refuse bag, to be partially pulled from within the interior volume of the receptacle 200. Once pulled, the bag can be clamped down upon by the flip lid assembly 206 as will be discussed.

Figure 24A:
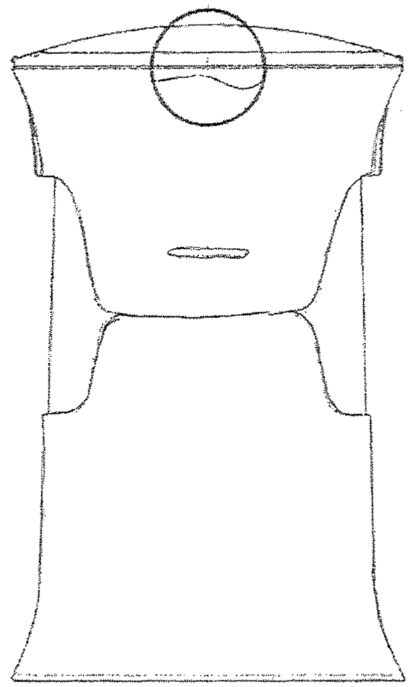
FIG. 24A is a front view of the expandable receptacle of FIG. 13 in the second position.

The inner element 224 of the main receptacle 202 is also provided with a locking tab 228 residing above the collar rest platform 210. The purpose of the locking tab 228 is to secure the receptacle 202 in the larger volume position when the base 212 of the telescoping collar 204 is resting on the collar rest platform 210. This is achieved with the provision of a locking orifice 230 located on the telescoping collar 204. Thus, when the receptacle 200 is positioned in the second position as shown in FIG. 24A, the locking tab 228 fits within the locking orifice 230 to temporarily secure the relative positions of the components. (The embodiment shown comprises a pair of locking tabs 228 and a pair of locking orifices 230 although for clarity only one of each is discussed herein. In some embodiments of the invention, there may only be one locking tab 228 and one locking orifice 230.) When it is desired to move the components to the first position of the receptacle, the telescoping collar 204 can be rotated which thereby separates the locking tab 228 from the locking orifice 230 and permits lowering of the telescoping collar to the collar rest edge 208. It will be appreciated that the main receptacle 202 includes a ramp 232 between the collar rest platform 210 and collar rest edge upon which the base 212 of the telescoping collar 204 may travel. The relationship of the locking tab 228 and locking orifice 230 may also be seen in FIG. 26.

Figure 23A:
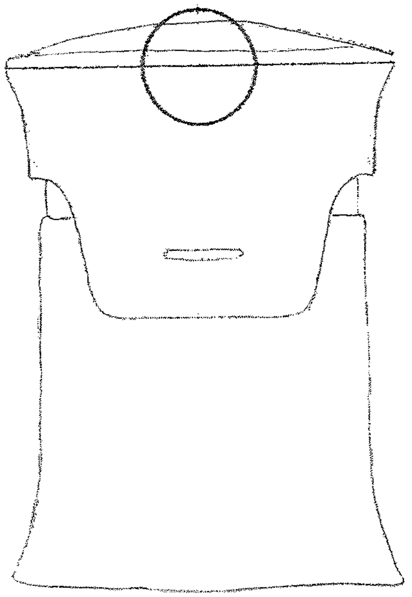
FIG. 23A is a front view of the expandable receptacle of FIG. 13 in the first position.
Figure 23B:
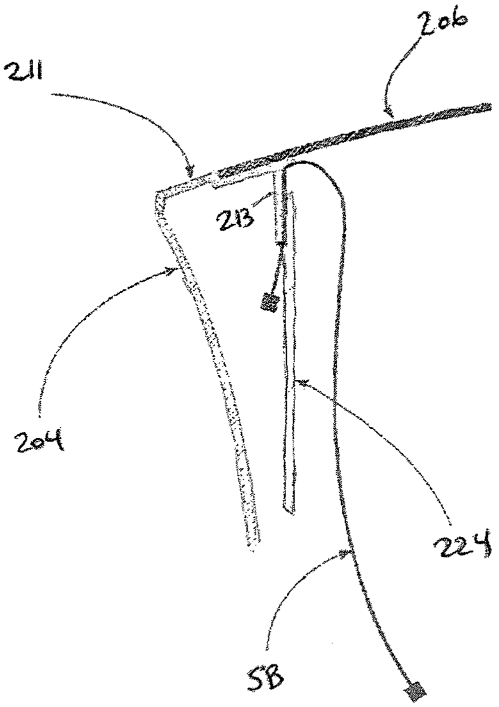
FIG. 23B is an exploded sectional view of a small bag securing method.

Referring to FIGS. 23A and 23B, there is shown positioning of the receptacle 200 for use with a small bag SB. Here, the flip lid assembly 206 is shown to include a perimeter extension 211 that is sized to a slightly larger outer diameter than the inner element 224. Thus, when a small bag SB is fitted over the inner element 224 the flip lid assembly 206 may be fitted thereupon to secure the small bag against the inner portion 224 by the perimeter extension, and specifically the inner flange 213 as shown. Notably in this configuration the small bag SB is not viewable on the exterior of the receptacle 200.

Figure 24B:
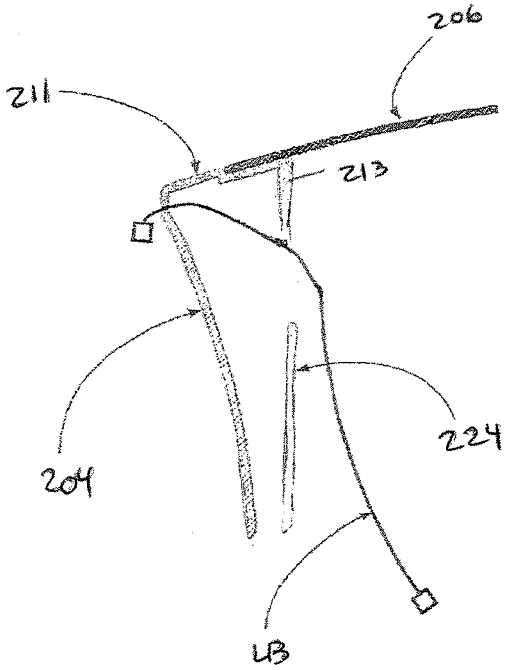
FIG. 24B is an exploded sectional view of a large bag securing method.
Figure 25:
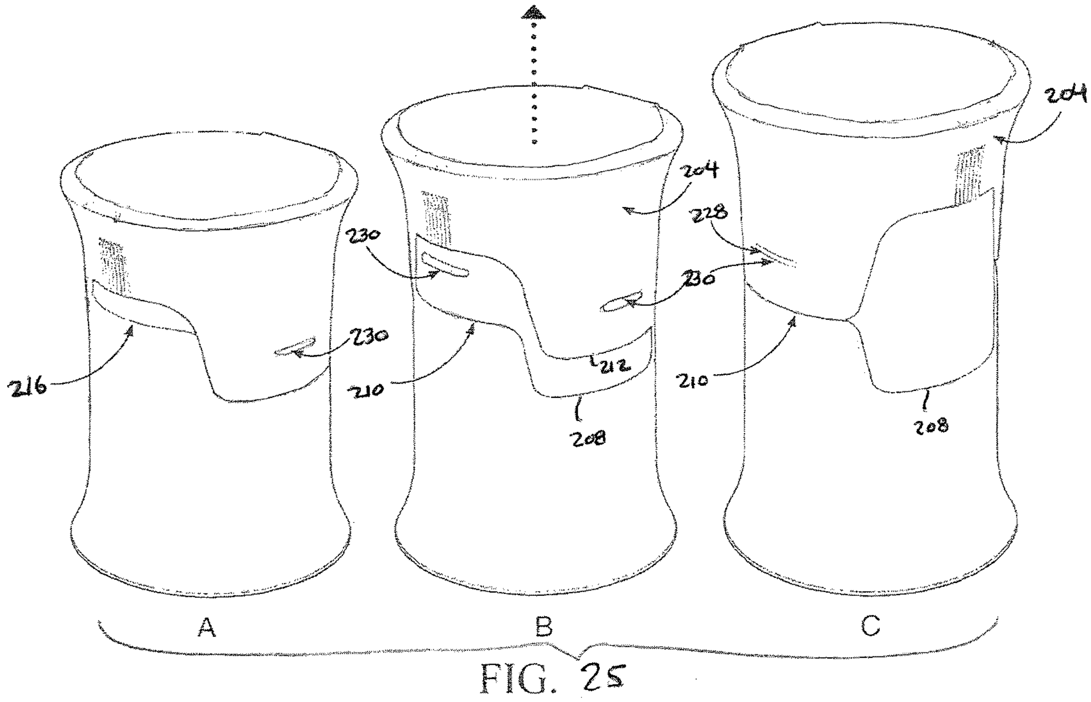
FIG. 25 is an isometric view of the expandable receptacle of FIG. 13 in three separate states; recessed, mid motion, and elevated state; and, FIG. 26 is a magnified view of an internal section of the expandable receptacle of FIG. 13 which shows how the telescoping collar locks in place in the second position.

When it is desired to use a large bag LB, the receptacle can be moved to the second position shown in FIGS. 24A and 24B as discussed previously. Here, the flip lid assembly 206 is shown as being attached to the telescoping collar 204 with the large bag LB supported therebetween. In this configuration, the large bag LB is squeezed between the telescoping collar 204 and the perimeter extension 211 to secure it to the receptacle 200. Notably, in this configuration the large bag LB is viewable on the exterior of the receptacle 200.F FIG. 25 demonstrates the three relative positions of the receptacle 200. In position A, the receptacle is in its reduced volume position, for example to accommodate a small refuse bag. In position C, the receptacle is in its large volume position, for example to accommodate a large refuse bag. It will be appreciated that to move from position A to position C, the receptacle 200 goes through position B, an intermediate position. Thus, the telescoping collar 204 is rotated 90 degrees about the main receptacle 202 while also being lifted along the ramp 232.

Figure 26:
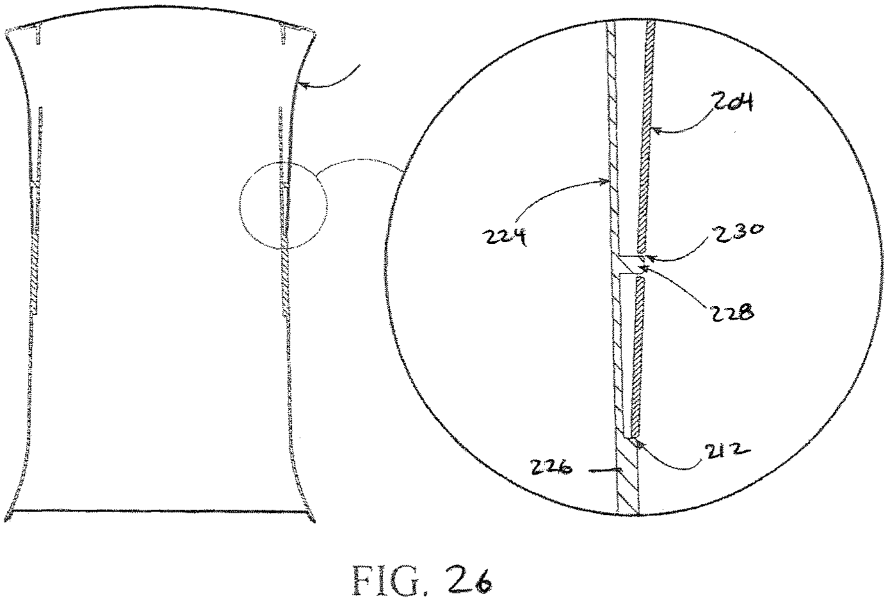

FIG. 26 illustrates an internal view of how the telescoping collar 204 locks in place for the large volume position. This occurs by the combination of the base 212 resting on the collar rest platform 210 while the locking tab 228 is inserted in to the locking orifice 230.

Although the invention herein has been described with reference to particular embodiments, it is to be understood that these embodiments are merely illustrative of the principles and applications of the present invention. It is therefore to understood that numerous modifications may be made to the illustrative embodiments and that other arrangements may be devised without departing from the spirit and scope of the present invention as defined by the appended claims.

The invention claimed is:

1. An expandable receptacle comprising:

a generally cylindrical and hollow main receptacle having a bottom edge, the main receptacle including an inner element and an outer element offset by a stepped portion, the outer element being adjacent to said bottom edge, the stepped portion forming a collar rest edge at a first height relative said bottom edge and a collar rest platform at a second height higher than said first height;

a telescoping collar formed as an annular sleeve having a lowermost edge, said telescoping collar adapted to fit over said inner element such that said lowermost edge rests on said collar rest edge in a first position or said collar rest platform in a second position;

the combined inner volume of the main receptacle and said telescoping collar being less in said first position than said second position;

further comprising a locking orifice on said telescoping collar and a locking tab on said inner element, said locking tab fitting within said locking orifice when said receptacle is in said second position.

2. The expandable receptacle of claim 1, further comprising a ramp portion on said stepped portion between said collar rest edge and said collar rest platform.

3. The expandable receptacle of claim 1, wherein said telescoping collar and said collar rest platform are separated by a vertical gap when said receptacle is in said first position.

4. The expandable receptacle of claim 1, further comprising a lid assembly, wherein a refuse bag may be trapped between said lid assembly and said inner element when the receptacle is in the first position and said lid assembly and said telescoping collar when said receptacle is in said second position.

5. The expandable receptacle of claim 4, wherein said second position of said receptacle supports a larger refuse bag than said first position of said receptacle and wherein the larger refuse bag is viewable from the exterior of the receptacle while the small bag is not.

6. An expandable receptacle comprising:

a generally cylindrical and hollow main receptacle having a bottom edge, the main receptacle including an inner element and an outer element offset by a stepped portion, the outer element being adjacent to said bottom edge, the stepped portion forming a collar rest edge at a first height relative said bottom edge and a collar rest platform at a second height higher than said first height;

a telescoping collar formed as an annular sleeve having a lowermost edge, said telescoping collar adapted to fit over said inner element such that said lowermost edge rests on said collar rest edge in a first position or said collar rest platform in a second position;

the combined inner volume of the main receptacle and said telescoping collar being less in said first position than said second position;

further comprising a lid assembly, wherein a refuse bag may be trapped between said lid assembly and said inner element when the receptacle is in the first position and said lid assembly and said telescoping collar when said receptacle is in said second position;

wherein said inner element includes bag mounting reliefs at an upper portion thereof.

7. An expandable receptacle comprising:

a generally cylindrical and hollow main receptacle having a bottom edge, the main receptacle including an inner element and an outer element offset by a stepped portion, the outer element being adjacent to said bottom edge, the stepped portion forming a collar rest edge at a first height relative said bottom edge and a collar rest platform at a second height higher than said first height;

a telescoping collar formed as an annular sleeve having a lowermost edge, said telescoping collar adapted to fit over said inner element such that said lowermost edge rests on said collar rest edge in a first position on said collar rest platform in a second position;

the combined inner volume of the main receptacle and said telescoping collar being less in said first position than said second position, wherein said telescoping collar is rotated approximately 90 degrees between the first position of said expandable receptacle and the second position.

8. An expandable receptacle comprising:

a generally cylindrical and hollow main receptacle having a bottom edge, the main receptacle including an inner element and an outer element offset by a stepped portion, the outer element being adjacent to said bottom edge, the stepped portion forming a collar rest edge at a first height relative said bottom edge and a collar rest platform at a second height higher than said first height;

telescoping collar formed as an annular sleeve having a lowermost edge, said telescoping collar adapted to fit over said inner element such that said lowermost edge rests on said collar rest edge in a first position or said collar rest platform in a second position;

the combined inner volume of the main receptacle and said telescoping collar being less in said first position than said second position, wherein said main receptacle includes a bottom floor;

wherein a refuse bag may be retained by said expandable receptacle and positioned through said telescoping collar toward said bottom floor.

9. The expandable receptacle of claim 8, wherein the refuse bag open end is positioned at an upper portion of said telescoping collar and its closed end is positioned where it extends toward said bottom floor.

10. The expandable receptacle of claim 9 wherein the closed end of the refuse bag rests on said bottom floor of said main receptacle.

11. An expandable receptacle comprising:

a generally cylindrical and hollow main receptacle having a bottom edge, and the main receptacle including an inner element and an outer element offset by a stepped portion, the outer element being adjacent to said bottom edge, the stepped portion forming a collar rest edge at a first height relative said bottom edge and a collar rest platform at a second height higher than said first height;

a telescoping collar formed as an annular sleeve having a lowermost edge, said telescoping collar adapted to fit over said inner element such that said lowermost edge rests on said collar rest edge in a first position or said collar rest platform in a second position;

the combined inner volume of the main receptacle and said telescoping collar being less in said first position than said second position;

wherein said main receptacle includes a bottom floor;

wherein a first refuse bag may be retained by said expandable receptacle and positioned through said telescoping collar to rest on said bottom floor in said first position but not in said second position.

12. The expandable receptacle of claim 11, wherein a second refuse bag, larger than said first refuse bag, may be retained by said expandable receptacle and positioned through said telescoping collar to rest on said bottom floor in both said first position and said second position.

13. An expandable receptacle comprising:

a generally cylindrical and hollow main receptacle having a floor, said main receptacle including an inner portion and an outer portion offset by a stepped portion formed by the top of the outer portion, the outer portion extending to said floor and the inner portion extending above the outer portion, the stepped portion forming a collar rest edge at a first height relative to said floor and a collar rest platform at a second height higher than said first height;

a telescoping collar formed as an annular sleeve having a lowermost edge, said telescoping collar adapted to fit over said inner portion such that said lowermost edge rests on said collar rest edge irk a first position or said collar rest platform in a second position;

the combined inner volume of the main receptacle and said telescoping collar being less in said first position than said second position;

wherein said telescoping collar is rotated approximately 90 degrees between the first position and the said expandable receptacle and the second position.

14. An expandable receptacle comprising:

a hollow main receptacle having a floor, said main receptacle forming a stepped portion on an outer surface thereof, the stepped portion including a collar rest edge at a first height relative to said floor and a collar rest platform at a second height higher than said first height;

a collar formed with walls and an open top and open bottom, the collar having a rest portion adapted to rest on said collar rest edge at a first height relative to said floor in a first position and said collar rest platform at a second height higher than said first height in a second position;

the combined inner volume of the main receptacle and said collar being less in said first position than said second position.

15. The expandable receptacle of claim 14, wherein said rest portion of said collar is a lowermost edge.

16. The expandable receptacle of claim 15, wherein said collar rest edge and said collar rest platform are approximately 90 degrees apart.

* * * * *